US011580055B2

United States Patent
Noyes et al.

(10) Patent No.: US 11,580,055 B2
(45) Date of Patent: Feb. 14, 2023

(54) DEVICES FOR TIME DIVISION MULTIPLEXING OF STATE MACHINE ENGINE SIGNALS

(71) Applicant: Micron Technology, Inc., Boise, ID (US)

(72) Inventors: Harold B Noyes, Boise, ID (US); David R. Brown, Lucas, TX (US); Paul Glendenning, Woodside, CA (US); Paul D. Dlugosch, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 107 days.

(21) Appl. No.: 17/007,636

(22) Filed: Aug. 31, 2020

(65) Prior Publication Data
US 2020/0401553 A1 Dec. 24, 2020

Related U.S. Application Data

(63) Continuation of application No. 15/534,994, filed as application No. PCT/US2015/067915 on Dec. 29, 2015, now Pat. No. 10,769,099.
(Continued)

(51) Int. Cl.
*G06F 15/78* (2006.01)
*G06N 20/00* (2019.01)
(Continued)

(52) U.S. Cl.
CPC ........ *G06F 15/7867* (2013.01); *G06F 1/3225* (2013.01); *G06F 9/4498* (2018.02);
(Continued)

(58) Field of Classification Search
None
See application file for complete search history.

(56) References Cited

U.S. PATENT DOCUMENTS 3,849,762 A  11/1974 Fujimoto et al.
3,921,136 A  11/1975 Bar-Lev
(Continued)

FOREIGN PATENT DOCUMENTS

EP  0476159 A1  3/1992
EP  0943995 A2  9/1999
(Continued)

OTHER PUBLICATIONS

Beesley, K. R.; Arabic Morphology Using Only Finite-State Operations; Xerox Research Centre Europe; pp. 50-57; 1998.
(Continued)

*Primary Examiner* — Bob A Phunkulh
(74) *Attorney, Agent, or Firm* — Fletcher Yoder, P.C.

(57) ABSTRACT

A device includes a plurality of blocks. Each block of the plurality of blocks includes a plurality of rows. Each row of the plurality of rows includes a plurality of configurable elements and a routing line, whereby each configurable element of the plurality of configurable elements includes a data analysis element comprising a plurality of memory cells, wherein the data analysis element is configured to analyze at least a portion of a data stream and to output a result of the analysis. Each configurable element of the plurality of configurable elements also includes a multiplexer configured to transmit the result to the routing line.

16 Claims, 19 Drawing Sheets

Related U.S. Application Data

(60) Provisional application No. 62/098,171, filed on Dec. 30, 2014.

(51) Int. Cl.
  *G06F 9/448*  (2018.01)
  *G06F 1/3225*  (2019.01)
  *G06F 13/42*  (2006.01)
  *G05B 19/045*  (2006.01)
  *G06F 3/06*  (2006.01)

(52) U.S. Cl.
  CPC ........ *G06F 13/423* (2013.01); *G06F 15/7857* (2013.01); *G06N 20/00* (2019.01); *G05B 19/045* (2013.01); *G06F 3/0604* (2013.01)

(56) References Cited

U.S. PATENT DOCUMENTS

| | | | |
|---|---|---|---|
| 4,011,547 A | 3/1977 | Kimmel | |
| 4,014,000 A | 3/1977 | Uno et al. | |
| 4,123,695 A | 10/1978 | Hale et al. | |
| 4,153,897 A | 5/1979 | Yasuda et al. | |
| 4,204,193 A | 5/1980 | Schroeder | |
| 4,414,685 A | 11/1983 | Sternberg | |
| 4,667,321 A | 5/1987 | Goodman | |
| 4,748,674 A | 5/1988 | Freeman | |
| 4,819,226 A | 4/1989 | Beckner et al. | |
| 5,014,327 A | 5/1991 | Potter et al. | |
| 5,028,821 A | 7/1991 | Kaplinsky | |
| 5,216,748 A | 6/1993 | Quenot et al. | |
| 5,257,361 A | 10/1993 | Doi et al. | |
| 5,287,523 A | 2/1994 | Allison et al. | |
| 5,291,482 A | 3/1994 | McHarg et al. | |
| 5,300,830 A | 4/1994 | Hawes | |
| 5,331,227 A | 7/1994 | Hawes | |
| 5,357,512 A | 10/1994 | Khaira et al. | |
| 5,371,878 A | 12/1994 | Coker | |
| 5,377,129 A | 12/1994 | Molvig et al. | |
| 5,459,798 A | 10/1995 | Bailey et al. | |
| 5,615,237 A | 3/1997 | Chang et al. | |
| 5,659,551 A | 8/1997 | Huott et al. | |
| 5,723,984 A | 3/1998 | Sharpe-Geisier | |
| 5,754,878 A | 5/1998 | Asghar et al. | |
| 5,790,531 A | 8/1998 | Ellebracht et al. | |
| 5,881,312 A | 3/1999 | Dulong | |
| 5,896,548 A | 4/1999 | Ofek | |
| 5,956,741 A | 9/1999 | Jones | |
| 6,011,407 A | 1/2000 | New | |
| 6,016,361 A | 1/2000 | Hongu et al. | |
| 6,034,963 A | 3/2000 | Minami et al. | |
| 6,041,405 A | 3/2000 | Green | |
| 6,052,766 A | 4/2000 | Betker et al. | |
| 6,058,469 A | 5/2000 | Baxter | |
| 6,151,644 A | 11/2000 | Wu | |
| 6,208,163 B1 | 3/2001 | Wittig et al. | |
| 6,240,003 B1 | 5/2001 | McElroy | |
| 6,279,128 B1 | 8/2001 | Arnold et al. | |
| 6,317,427 B1 | 11/2001 | Augusta et al. | |
| 6,362,868 B1 | 3/2002 | Silverbrook | |
| 6,400,996 B1 | 6/2002 | Hoffberg et al. | |
| 6,501,296 B2 | 12/2002 | Wittig et al. | |
| 6,606,699 B2 | 8/2003 | Pechanek et al. | |
| 6,614,703 B2 | 9/2003 | Pitts et al. | |
| 6,625,740 B1 | 9/2003 | Datar et al. | |
| 6,633,443 B1 | 10/2003 | Watanabe et al. | |
| 6,636,483 B1 | 10/2003 | Pannell | |
| 6,640,262 B1 | 10/2003 | Uppunda et al. | |
| 6,697,979 B1 | 2/2004 | Vorbach et al. | |
| 6,700,404 B1 | 3/2004 | Feng et al. | |
| 6,880,087 B1 | 4/2005 | Carter | |
| 6,906,938 B2 | 6/2005 | Kaginele | |
| 6,944,710 B2 | 9/2005 | Regev et al. | |
| 6,977,897 B1 | 12/2005 | Nelson et al. | |
| 7,010,639 B2 | 3/2006 | Larson et al. | |
| 7,089,352 B2 | 8/2006 | Regev et al. | |
| 7,146,643 B2 | 12/2006 | Papp et al. | |
| 7,176,717 B2 | 2/2007 | Sunkavalli et al. | |
| 7,268,581 B1 | 9/2007 | Trimberger et al. | |
| 7,276,934 B1 | 10/2007 | Young | |
| 7,305,047 B1 | 12/2007 | Turner | |
| 7,358,761 B1 | 4/2008 | Sunkavalli et al. | |
| 7,366,352 B2 | 4/2008 | Kravec et al. | |
| 7,392,229 B2 | 6/2008 | Harris et al. | |
| 7,428,722 B2 | 9/2008 | Sunkavalli et al. | |
| 7,487,131 B2 | 2/2009 | Harris et al. | |
| 7,487,542 B2 | 2/2009 | Boulanger et al. | |
| 7,499,464 B2 | 3/2009 | Ayrapetian et al. | |
| 7,635,989 B1 | 12/2009 | Young | |
| 7,725,510 B2 | 5/2010 | Alicherry et al. | |
| 7,774,286 B1 | 8/2010 | Harris | |
| 7,804,719 B1 | 9/2010 | Chirania et al. | |
| 7,890,923 B2 | 2/2011 | Elaasar | |
| 7,899,052 B1 | 3/2011 | Hao et al. | |
| 7,917,684 B2 | 3/2011 | Noyes et al. | |
| 7,970,964 B2 | 6/2011 | Noyes | |
| 8,015,530 B1 | 9/2011 | Sinclair et al. | |
| 8,020,131 B1 | 9/2011 | Van Mau et al. | |
| 8,065,249 B1 | 11/2011 | Harris et al. | |
| 8,140,780 B2 | 3/2012 | Noyes | |
| 8,146,040 B1 | 3/2012 | Janneck et al. | |
| 8,159,900 B2 | 4/2012 | Moore et al. | |
| 8,209,521 B2 | 6/2012 | Noyes et al. | |
| 8,239,660 B2 | 8/2012 | Cervini | |
| 8,254,378 B2 | 8/2012 | Haas | |
| 8,281,395 B2 | 10/2012 | Pawlowski | |
| 8,294,490 B1 | 10/2012 | Kaviani | |
| 8,358,148 B1 | 1/2013 | Kaviani | |
| 8,402,188 B2 | 3/2013 | Noyes et al. | |
| 8,536,896 B1 | 9/2013 | Trimberger | |
| 8,593,175 B2 | 11/2013 | Noyes et al. | |
| 8,648,621 B2 | 2/2014 | Noyes et al. | |
| 8,680,888 B2 | 3/2014 | Brown et al. | |
| 8,725,961 B2 | 5/2014 | Noyes | |
| 8,782,624 B2 | 7/2014 | Brown et al. | |
| 8,938,590 B2 | 1/2015 | Noyes et al. | |
| 9,058,465 B2 | 6/2015 | Noyes et al. | |
| 9,063,532 B2 | 6/2015 | Brown | |
| 9,075,428 B2 | 7/2015 | Brown | |
| 9,118,327 B2 | 8/2015 | Noyes et al. | |
| 9,203,397 B1 * | 12/2015 | Ebeling | H03K 17/22 |
| 9,235,798 B2 | 1/2016 | Brown et al. | |
| 2002/0112141 A1 | 4/2002 | Greenwood et al. | |
| 2002/0186044 A1 | 12/2002 | Agrawal et al. | |
| 2003/0107996 A1 | 6/2003 | Black et al. | |
| 2003/0142698 A1 | 7/2003 | Parhl | |
| 2003/0163615 A1 | 8/2003 | Yu | |
| 2003/0226002 A1 | 12/2003 | Boutaud et al. | |
| 2004/0100980 A1 | 5/2004 | Jacobs et al. | |
| 2004/0125807 A1 | 7/2004 | Liu et al. | |
| 2004/0151211 A1 | 8/2004 | Snider | |
| 2004/0184662 A1 | 9/2004 | Kravec et al. | |
| 2005/0025138 A1 | 2/2005 | Greshman | |
| 2005/0154916 A1 | 7/2005 | Boulanger et al. | |
| 2005/0251638 A1 | 11/2005 | Boutaud et al. | |
| 2006/0158219 A1 | 7/2006 | Sunkavalli et al. | |
| 2006/0195496 A1 | 8/2006 | Vadi et al. | |
| 2006/0206875 A1 | 9/2006 | Ullmann et al. | |
| 2006/0257043 A1 | 11/2006 | Chiu | |
| 2006/0274001 A1 | 12/2006 | Guttag et al. | |
| 2006/0288070 A1 | 12/2006 | Vadi et al. | |
| 2007/0005869 A1 | 1/2007 | Balraj et al. | |
| 2007/0075878 A1 | 4/2007 | Furodet et al. | |
| 2007/0115024 A1 | 5/2007 | Goetting et al. | |
| 2007/0127482 A1 | 6/2007 | Harris et al. | |
| 2007/0150623 A1 | 6/2007 | Kravec et al. | |
| 2007/0282833 A1 | 12/2007 | McMillen | |
| 2007/0283108 A1 | 12/2007 | Isherwood et al. | |
| 2008/0040638 A1 * | 2/2008 | Goessel | G01R 31/31703 714/732 |
| 2008/0126690 A1 | 5/2008 | Rajan et al. | |
| 2008/0129334 A1 | 6/2008 | Sunkavalli et al. | |
| 2008/0133874 A1 | 6/2008 | Capek et al. | |
| 2008/0140661 A1 | 6/2008 | Pandya | |

(56) References Cited

U.S. PATENT DOCUMENTS

| | | | |
|---|---|---|---|
| 2008/0178031 A1 | 7/2008 | Dong-Han | |
| 2008/0256347 A1 | 10/2008 | Eickemeyer et al. | |
| 2008/0320053 A1 | 12/2008 | Iijima et al. | |
| 2009/0083466 A1* | 3/2009 | Hartwich | G06F 13/1663 710/112 |
| 2009/0198952 A1 | 8/2009 | Khmeinitsky et al. | |
| 2009/0204734 A1 | 8/2009 | Strait et al. | |
| 2009/0300254 A1* | 12/2009 | Newald | H04L 12/407 710/305 |
| 2010/0100691 A1 | 4/2010 | Noyes et al. | |
| 2010/0100714 A1 | 4/2010 | Noyes et al. | |
| 2010/0115173 A1 | 5/2010 | Noyes | |
| 2010/0115347 A1 | 5/2010 | Noyes | |
| 2010/0118425 A1 | 5/2010 | Rafaelof | |
| 2010/0138432 A1 | 6/2010 | Noyes | |
| 2010/0138575 A1 | 6/2010 | Noyes | |
| 2010/0138634 A1 | 6/2010 | Noyes | |
| 2010/0138635 A1 | 6/2010 | Noyes | |
| 2010/0175130 A1 | 6/2010 | Pawlowski | |
| 2010/0174887 A1 | 7/2010 | Pawlowski | |
| 2010/0174929 A1 | 7/2010 | Pawlowski | |
| 2010/0185647 A1 | 7/2010 | Noyes | |
| 2010/0250996 A1* | 9/2010 | Swoboda | G06F 13/364 713/500 |
| 2010/0145182 A1 | 10/2010 | Schmidt et al. | |
| 2010/0281131 A1* | 11/2010 | HesselBarth | H04L 12/4135 709/236 |
| 2010/0325352 A1 | 12/2010 | Schuette et al. | |
| 2010/0332809 A1 | 12/2010 | Noyes et al. | |
| 2011/0004578 A1 | 1/2011 | Momma et al. | |
| 2011/0145182 A1 | 6/2011 | Dlugosch | |
| 2011/0145544 A1 | 6/2011 | Noyes et al. | |
| 2011/0161620 A1 | 6/2011 | Kaminski et al. | |
| 2011/0208900 A1 | 8/2011 | Schuette et al. | |
| 2011/0258360 A1 | 10/2011 | Noyes | |
| 2011/0145271 A1 | 12/2011 | Noyes et al. | |
| 2011/0307233 A1 | 12/2011 | Tseng et al. | |
| 2011/0307433 A1 | 12/2011 | Dlugosch | |
| 2011/0307503 A1 | 12/2011 | Dlugosch | |
| 2011/0320759 A1 | 12/2011 | Craddock et al. | |
| 2012/0192163 A1 | 6/2012 | Glendenning et al. | |
| 2012/0179854 A1 | 7/2012 | Noyes | |
| 2012/0192164 A1 | 7/2012 | Xu et al. | |
| 2012/0192165 A1 | 7/2012 | Xu et al. | |
| 2012/0192166 A1 | 7/2012 | Xu et al. | |
| 2013/0022136 A1 | 1/2013 | Collins | |
| 2013/0154685 A1 | 6/2013 | Noyes | |
| 2013/0156043 A1 | 6/2013 | Brown et al. | |
| 2013/0159239 A1 | 6/2013 | Brown et al. | |
| 2013/0159670 A1 | 6/2013 | Noyes | |
| 2013/0159671 A1 | 6/2013 | Brown et al. | |
| 2013/0275709 A1 | 10/2013 | Gajapathy | |
| 2014/0025614 A1 | 1/2014 | Noyes et al. | |
| 2014/0025923 A1 | 1/2014 | Klein | |
| 2014/0067736 A1 | 3/2014 | Noyes | |
| 2014/0068167 A1 | 3/2014 | Brown et al. | |
| 2014/0068234 A1 | 3/2014 | Brown | |
| 2014/0204956 A1 | 7/2014 | Brown et al. | |
| 2014/0225889 A1 | 8/2014 | Kim et al. | |
| 2014/0277590 A1 | 9/2014 | Brown | |
| 2014/0279776 A1 | 9/2014 | Brown et al. | |
| 2014/0325494 A1 | 10/2014 | Brown et al. | |

FOREIGN PATENT DOCUMENTS

| | | |
|---|---|---|
| JP | 08087462 A | 4/1996 |
| JP | 10069459 A | 3/1998 |
| JP | 10111862 A | 4/1998 |
| JP | 2000231549 A | 8/2000 |
| JP | 2000347708 A | 12/2000 |
| KR | 1020080097573 A | 11/2008 |
| WO | WO0065425 A1 | 11/2000 |
| WO | WO0138978 A1 | 5/2001 |
| WO | WO03039001 A1 | 5/2003 |
| WO | WO2005036750 A1 | 4/2005 |
| WO | WO2011114120 A1 | 9/2011 |

OTHER PUBLICATIONS

Bird, S. et al.; One-Level Phonology: Autosegmental Representations and Rules as Finite Automata; Association for Computational Linguistics; University of Edinburgh; vol. 20; No. 1; pp. 55-90; 1994.

Bispo, J. et al.; Regular Expression Matching for Reconfigurable Packet Inspection; IEEE International Conference on Field Programmable Technology; 2006.

Bispo, J. et al.; Synthesis of Regular Expressions Targeting FPGAs: Current Status and Open Issues; IST/INESC-ID, Libson, Portugal; pp. 1-12; 2007.

Brodie, B. et al.; A scalable Architecture for High-Throughput Regular-Expression Pattern Matching; Exegy Inc.; pp. 1-12; 2006.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the 12$^{th}$ Annual IEEE symposium on Field-Programmable Custom Computing Machines (FCCM'04);Georgia Institute of Technology; pp. 1-9; 2004.

Clark, C. et al.; A Unified Model of Pattern-Matching Circuit Architectmes; Tech Report GIT-CERCS-05-20;Georgia Institute of Technology; pp. 1-17; 2005.

Fide, S.; String Processing in Hardware; Scalable Parallel and Distributed Systems Lab; Proceedings of the 12$^{th}$ Annual IEEE symposium on Field-Programmable Custom Computing Machines (FCCM'04); School ofElectrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21; 2002.

Korenek, J.; Traffic Scanner-Hardware Accelerated Intrusion Detection System; http://www.liberouter.org/ ; 2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12; 2001.

Wada, T.; Multiobject Behavior Recogmtion Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

FREESCALE and KASPERSKY® Accelerated Antivirus Solution Platform for OEM Vendors; Freescale Semiconductors Document; pp. 1-16; 2007.

PCT/US2009/067534 International Search Report and Written Opinion dated Apr. 26, 2010.

PCT/US2009/061649 International Search Report dated Feb. 15, 2010.

(56) References Cited

OTHER PUBLICATIONS

Taiwan Application No. 098144804 Office Action dated Nov. 4, 2013.
PCT/US2012/067992 International Search Report dated Mar. 28, 2013.
PCT/US2012/068011 International Search Report dated Apr. 15, 2013.
PCT/US2012/067999 International Search Report dated May 14, 2013.
PCT/US2012/067995 International Search Report dated May 17, 2013.
PCT/US2012/067988 International Search Report (Partial) dated Jun. 24, 2014.
PCT/US2013/049744 International Search Report and Written Opinion dated Oct. 22, 2013.
PCT/US2013/049748 International Search Report and Written Opinion dated Oct. 22, 2013.
PCT/US2013/049755 International Search Report and Written Opinion dated Oct. 24, 2013.
PCT/US2013/049753 International Search Report and Written Opinion dated Nov. 7, 2013.
PCT/US2013/055434 International Search Report and Written Opinion dated Nov. 29, 2013.
PCT/US2013/055438 International Search Report and Written Opinion dated Nov. 29, 2013.
PCT/US2013/055436 International Search Report and Written Opinion dated Dec. 9, 2013.
PCT/US2014/023589 International Search Report and Written Opinion dated Jul. 24, 2014.
Soewito et al., "Self-Addressable Memory-Based FSM: A scalable Intrusion Detection Engine", IEEE Network, pp. 14-21; Feb. 2009.
Hurson A. R.; A VLSI Design for the Parallel Finite State Automation and Its Performance Evaluation as a Hardware Scanner; International Journal of Computer and Information Sciences, vol. 13, No. 6; 1984.
Carpenter et al., "A Massively Parallel Architecture for a Self-Organizing Neural Pattern Recognition Machine", Academic Press, Inc.; 1987.
Cong et al., "Application-Specific Instruction Generation for Configurable Processor Architectures", Computer Science Department, University of California, ACM; 2004.
Glette et al., "An Online EHW Pattern Recognition System Applied to Face Image Recognition", University of Oslo, Norway; 2007.
Kawai et al., "An Adaptive Pattern Recognition Hardware with On-chip Shift Register-based Partial Reconfiguration", IEEE; 2008.
Kutrib et al., "Massively Parallel Pattern Recognition with Link Features", IFIG Research Report 0003; 2000.
Marculescu et al., Power Management of Multi-Core Systems: Challenges, Approaches, and Recent Developments Tutorial at ASPLOS, London, UK [online]; Mar. 4, 2012.
Vitanen et al.; Image Pattern Recognition Using Configurable Logic Cell Array; New Advances in Computer Graphics; pp. 355-368; 1989.
Yasunaga et al., "Kernel-based Pattern Recognition Hardware: Its Design Methodology Using Evolved Truth Tables", IEEE, 2000.
U.S. Appl. No. 60/652,738, filed Feb. 12, 2005, Harris.
U.S. Appl. No. 61/788,364, filed Mar. 15, 2013, Brown.

* cited by examiner

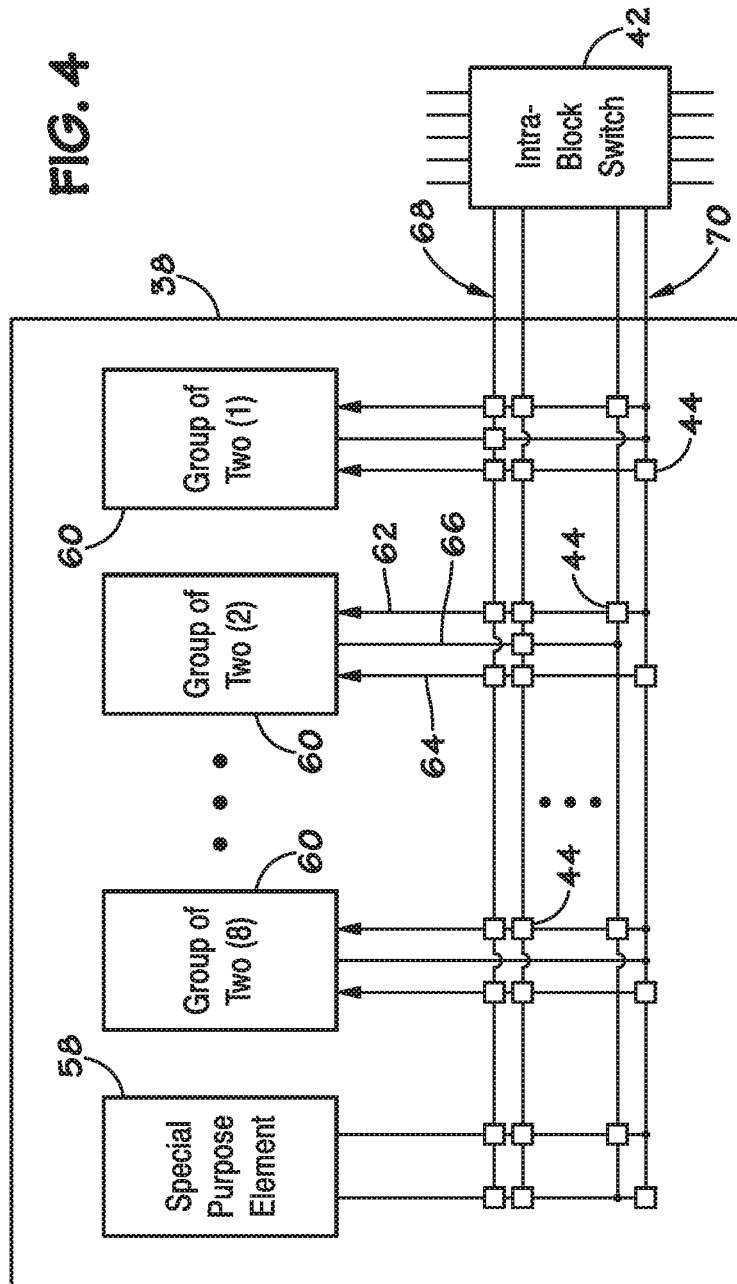

| S1 | S0 | Output |
|----|----|--------|
| 0 | 0 | Hi-Z |
| 0 | 1 | STE 0 |
| 1 | 0 | STE 1 |
| 1 | 1 | STE 0 or STE 1 | ns
DEVICES FOR TIME DIVISION MULTIPLEXING OF STATE MACHINE ENGINE SIGNALS

CROSS-REFERENCE TO RELATED APPLICATIONS

The present application is a continuation of U.S. application Ser. No. 15/534,994, entitled "Devices for Time Division Multiplexing of State Machine Engine Signals," filed Jun. 9, 2017, now U.S. Pat. No. 10,769,099 which issued on Sep. 8, 2020, which is a national stage application, filed under 35 U. S. C. § 371, of International Patent Application No. PCT/US2015/067915 entitled "Devices for Time Division Multiplexing of State Machine Engine Signals," filed Dec. 29, 2015, which claimed priority to U.S. Provisional Patent Application No. 62/098,171, entitled "Devices for Time Division Multiplexing of State Machine Engine Signals," filed Dec. 30, 2014, the entirety of which is incorporated by reference herein for all purposes.

BACKGROUND

Field of Invention

Embodiments of the invention relate generally to electronic devices and, more specifically, in certain embodiments, to electronic devices with parallel devices for data analysis.

Description of Related Art

Complex pattern recognition can be inefficient to perform on a conventional von Neumann based computer. A biological brain, in particular a human brain, however, is adept at performing pattern recognition. Current research suggests that a human brain performs pattern recognition using a series of hierarchically organized neuron layers in the neocortex. Neurons in the lower layers of the hierarchy analyze "raw signals" from, for example, sensory organs, while neurons in higher layers analyze signal outputs from neurons in the lower levels. This hierarchical system in the neocortex, possibly in combination with other areas of the brain, accomplishes the complex pattern recognition that enables humans to perform high level functions such as spatial reasoning, conscious thought, and complex language.

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Hardware has been designed to search a data stream for patterns, but this hardware often is unable to process adequate amounts of data in an amount of time given. Some devices configured to search a data stream do so by distributing the data stream among a plurality of circuits. The circuits each determine whether the data stream matches a portion of a pattern. Often, a large number of circuits operate in parallel, each searching the data stream at generally the same time. The system may then further process the results from these circuits, to arrive at the final results. These "intermediate results", however, can be larger than the original input data, which may pose issues for the system. The ability to use a cascaded circuits approach, similar to the human brain, offers one potential solution to this problem. However, there has not been a system that effectively allows for performing pattern recognition in a manner more comparable to that of a biological brain. Development of such a system is desirable.

BRIEF DESCRIPTION OF DRAWINGS

FIG. 4 illustrates an example of a row of the block of FIG. 3, according to various embodiments.

DETAILED DESCRIPTION

Figure 1:
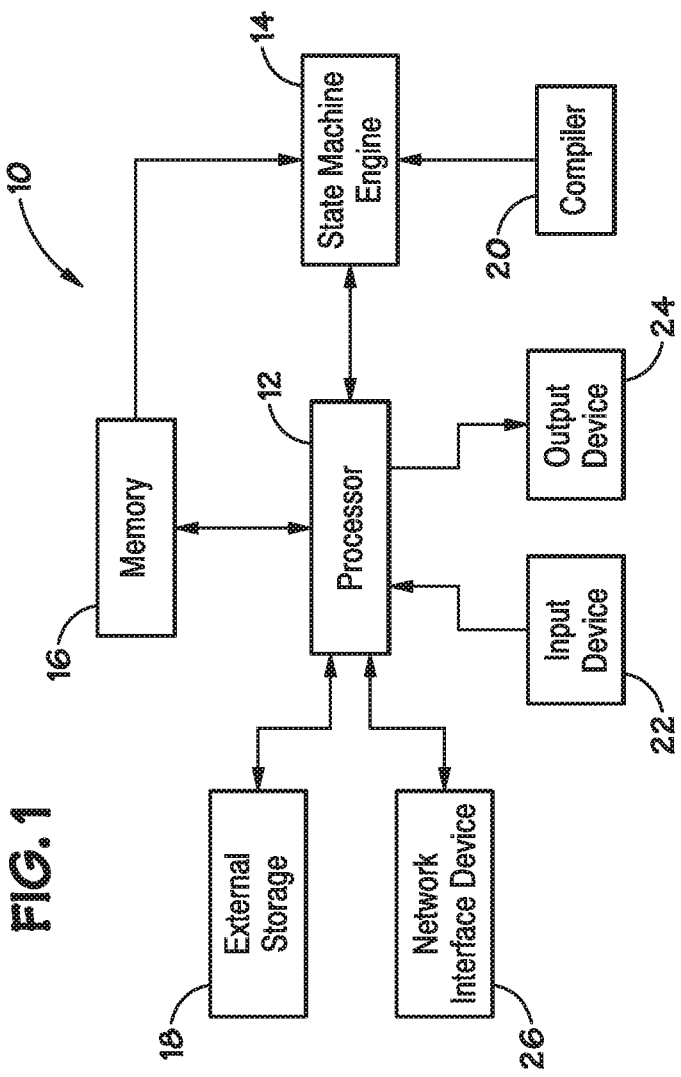
FIG. 1 illustrates an example of system having a state machine engine, according to various embodiments.

Turning now to the figures, FIG. 1 illustrates an embodiment of a processor-based system, generally designated by reference numeral 10. The system 10 may be any of a variety of types such as a desktop computer, laptop computer, pager, cellular phone, personal organizer, portable audio player, control circuit, camera, etc. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

In a typical processor-based device, such as the system 10, a processor 12, such as a microprocessor, controls the processing of system functions and requests in the system 10. Further, the processor 12 may comprise a plurality of processors that share system control. The processor 12 may be coupled directly or indirectly to each of the elements in the system 10, such that the processor 12 controls the system 10 by executing instructions that may be stored within the system 10 or external to the system 10.

In accordance with the embodiments described herein, the system 10 includes a state machine engine 14, which may operate under control of the processor 12. The state machine engine 14 may employ any one of a number of state machine architectures, including, but not limited to Mealy architectures, Moore architectures, Finite State Machines (FSMs), Deterministic FSMs (DFSMs), Bit-Parallel State Machines (BPSMs), etc. Though a variety of architectures may be used, for discussion purposes, the application refers to FSMs. However, those skilled in the art will appreciate that the described techniques may be employed using any one of a variety of state machine architectures.

As discussed further below, the state machine engine 14 may include a number of (e.g., one or more) finite state machine (FSM) lattices (e.g., core of a chip). For purposes of this application the term "lattice" refers to an organized framework (e.g., routing matrix, routing network, frame) of elements (e.g., Boolean cells, counter cells, state machine elements, state transition elements). Furthermore, the "lattice" may have any suitable shape, structure, or hierarchical organization (e.g., grid, cube, spherical, cascading). Each FSM lattice may implement multiple FSMs that each receive and analyze the same data in parallel. Further, the FSM lattices may be arranged in groups (e.g., clusters), such that clusters of FSM lattices may analyze the same input data in parallel. Further, clusters of FSM lattices of the state machine engine 14 may be arranged in a hierarchical structure wherein outputs from state machine lattices on a lower level of the hierarchical structure may be used as inputs to state machine lattices on a higher level. By cascading clusters of parallel FSM lattices of the state machine engine 14 in series through the hierarchical structure, increasingly complex patterns may be analyzed (e.g., evaluated, searched, etc.).

Further, based on the hierarchical parallel configuration of the state machine engine 14, the state machine engine 14 can be employed for complex data analysis (e.g., pattern recognition or other processing) in systems that utilize high processing speeds. For instance, embodiments described herein may be incorporated in systems with processing speeds of 1 GByte/sec. Accordingly, utilizing the state machine engine 14, data from high speed memory devices or other external devices may be rapidly analyzed. The state machine engine 14 may analyze a data stream according to several criteria (e.g., search terms), at about the same time, e.g., during a single device cycle. Each of the FSM lattices within a cluster of FSMs on a level of the state machine engine 14 may each receive the same search term from the data stream at about the same time, and each of the parallel FSM lattices may determine whether the term advances the state machine engine 14 to the next state in the processing criterion. The state machine engine 14 may analyze terms according to a relatively large number of criteria, e.g., more than 100, more than 110, or more than 10,000. Because they operate in parallel, they may apply the criteria to a data stream having a relatively high bandwidth, e.g., a data stream of greater than or generally equal to 1 GByte/sec, without slowing the data stream.

In one embodiment, the state machine engine 14 may be configured to recognize (e.g., detect) a great number of patterns in a data stream. For instance, the state machine engine 14 may be utilized to detect a pattern in one or more of a variety of types of data streams that a user or other entity might wish to analyze. For example, the state machine engine 14 may be configured to analyze a stream of data received over a network, such as packets received over the Internet or voice or data received over a cellular network. In one example, the state machine engine 14 may be configured to analyze a data stream for spam or malware. The data stream may be received as a serial data stream, in which the data is received in an order that has meaning, such as in a temporally, lexically, or semantically significant order. Alternatively, the data stream may be received in parallel or out of order and, then, converted into a serial data stream, e.g., by reordering packets received over the Internet. In some embodiments, the data stream may present terms serially, but the bits expressing each of the terms may be received in parallel. The data stream may be received from a source external to the system 10, or may be formed by interrogating a memory device, such as the memory 16, and forming the data stream from data stored in the memory 16. In other examples, the state machine engine 14 may be configured to recognize a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase. The stream of data to be analyzed may include multiple bits of data in a binary format or other formats, e.g., base ten, ASCII, etc. The stream may encode the data with a single digit or multiple digits, e.g., several binary digits.

As will be appreciated, the system 10 may include memory 16. The memory 16 may include volatile memory, such as Dynamic Random Access Memory (DRAM), Static Random Access Memory (SRAM), Synchronous DRAM (SDRAM), Double Data Rate DRAM (DDR SDRAM), DDR2 SDRAM, DDR3 SDRAM, etc. The memory 16 may also include non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) to be used in conjunction with the volatile memory. The memory 16 may include one or more memory devices, such as DRAM devices, that may provide data to be analyzed by the state machine engine 14. As used herein, the term "provide" may generically refer to direct, input, insert, issue, route, send, transfer, transmit, generate, give, make available, move, output, pass, place, read out, write, etc. Such devices may be referred to as or include solid state drives (SSD's), MultimediaMediaCards (MMC's), SecureDigital (SD) cards, CompactFlash (CF) cards, or any other suitable device. Further, it should be appreciated that such devices may couple to the system 10 via any suitable interface, such as Universal Serial Bus (USB), Peripheral Component Interconnect (PCI), PCI Express (PCI-E), Small Computer System Interface (SCSI), IEEE 1394 (Firewire), or any other suitable interface. To facilitate operation of the memory 16, such as the flash memory devices, the system 10 may include a memory controller (not illustrated). As will be appreciated, the memory controller may be an independent device or it may be integral with the processor 12. Additionally, the system 10 may include an external storage 18, such as a magnetic storage device. The external storage may also provide input data to the state machine engine 14.

The system 10 may include a number of additional elements. For instance, a compiler 20 may be used to configure (e.g., program) the state machine engine 14, as described in more detail with regard to FIG. 8. An input device 22 may also be coupled to the processor 12 to allow a user to input data into the system 10. For instance, an input device 22 may be used to input data into the memory 16 for later analysis by the state machine engine 14. The input device 22 may include buttons, switching elements, a keyboard, a light pen, a stylus, a mouse, and/or a voice recognition system, for instance. An output device 24, such as a display may also be coupled to the processor 12. The display 24 may include an LCD, a CRT, LEDs, and/or an audio display, for example. They system may also include a network interface device 26, such as a Network Interface Card (NIC), for interfacing with a network, such as the Internet. As will be appreciated, the system 10 may include many other components, depending on the application of the system 10.

FIGS. 2-5 illustrate an example of a FSM lattice 30. In an example, the FSM lattice 30 comprises an array of blocks 32. As will be described, each block 32 may include a plurality of selectively couple-able hardware elements (e.g., configurable elements and/or special purpose elements) that correspond to a plurality of states in a FSM. Similar to a state in a FSM, a hardware element can analyze an input stream and activate a downstream hardware element, based on the input stream.

The configurable elements can be configured (e.g., programmed) to implement many different functions. For instance, the configurable elements may include state transition elements (STEs) 34, 36 (shown in FIG. 5) that function as data analysis elements and are hierarchically organized into rows 38 (shown in FIGS. 3 and 4) and blocks 32 (shown in FIGS. 2 and 3). The STEs each may be considered an automaton, e.g., a machine or control mechanism designed to follow automatically a predetermined sequence of operations or respond to encoded instructions. Taken together, the STEs form an automata processor as state machine engine 14. To route signals between the hierarchically organized STEs 34, 36, a hierarchy of configurable switching elements can be used, including inter-block switching elements 40 (shown in FIGS. 2 and 3), intra-block switching elements 42 (shown in FIGS. 3 and 4) and intra-row switching elements 44 (shown in FIG. 4).

As described below, the switching elements may include routing structures and buffers. A STE 34, 36 can correspond to a state of a FSM implemented by the FSM lattice 30. The STEs 34, 36 can be coupled together by using the configurable switching elements as described below. Accordingly, a FSM can be implemented on the FSM lattice 30 by configuring the STEs 34, 36 to correspond to the functions of states and by selectively coupling together the STEs 34, 36 to correspond to the transitions between states in the FSM.

Figure 2:
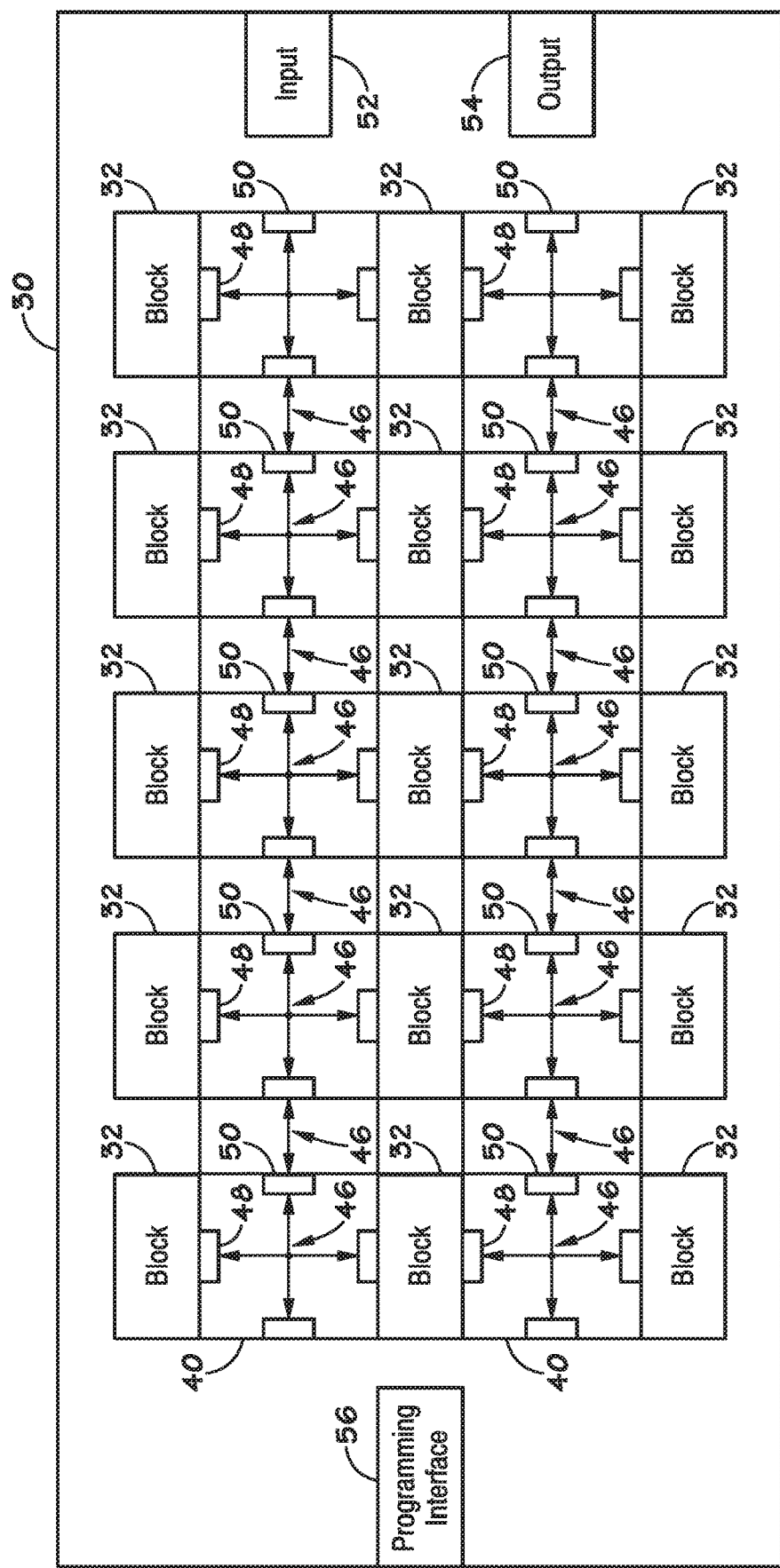
FIG. 2 illustrates an example of an FSM lattice of the state machine engine of FIG. 1, according to various embodiments.

FIG. 2 illustrates an overall view of an example of a FSM lattice 30. The FSM lattice 30 includes a plurality of blocks 32 that can be selectively coupled together with configurable inter-block switching elements 40. The inter-block switching elements 40 may include conductors 46 (e.g., wires, traces, etc.) and buffers 48, 50. In an example, buffers 48 and 50 are included to control the connection and timing of signals to/from the inter-block switching elements 40. As described further below, the buffers 48 may be provided to buffer data being sent between blocks 32, while the buffers 50 may be provided to buffer data being sent between inter-block switching elements 40. Additionally, the blocks 32 can be selectively coupled to an input block 52 (e.g., a data input port) for receiving signals (e.g., data) and providing the data to the blocks 32. The blocks 32 can also be selectively coupled to an output block 54 (e.g., an output port) for providing signals from the blocks 32 to an external device (e.g., another FSM lattice 30). The FSM lattice 30 can also include a programming interface 56 to configure (e.g., via an image, program) the FSM lattice 30. The image can configure (e.g., set) the state of the STEs 34, 36. For example, the image can configure the STEs 34, 36 to react in a certain way to a given input at the input block 52. For example, a STE 34, 36 can be set to output a high signal when the character 'a' is received at the input block 52.

In an example, the input block 52, the output block 54, and/or the programming interface 56 can be implemented as registers such that writing to or reading from the registers provides data to or from the respective elements. Accordingly, bits from the image stored in the registers corresponding to the programming interface 56 can be loaded on the STEs 34, 36. Although FIG. 2 illustrates a certain number of conductors (e.g., wire, trace) between a block 32, input block 52, output block 54, and an inter-block switching element 40, it should be understood that in other examples, fewer or more conductors may be used.

Figure 3:
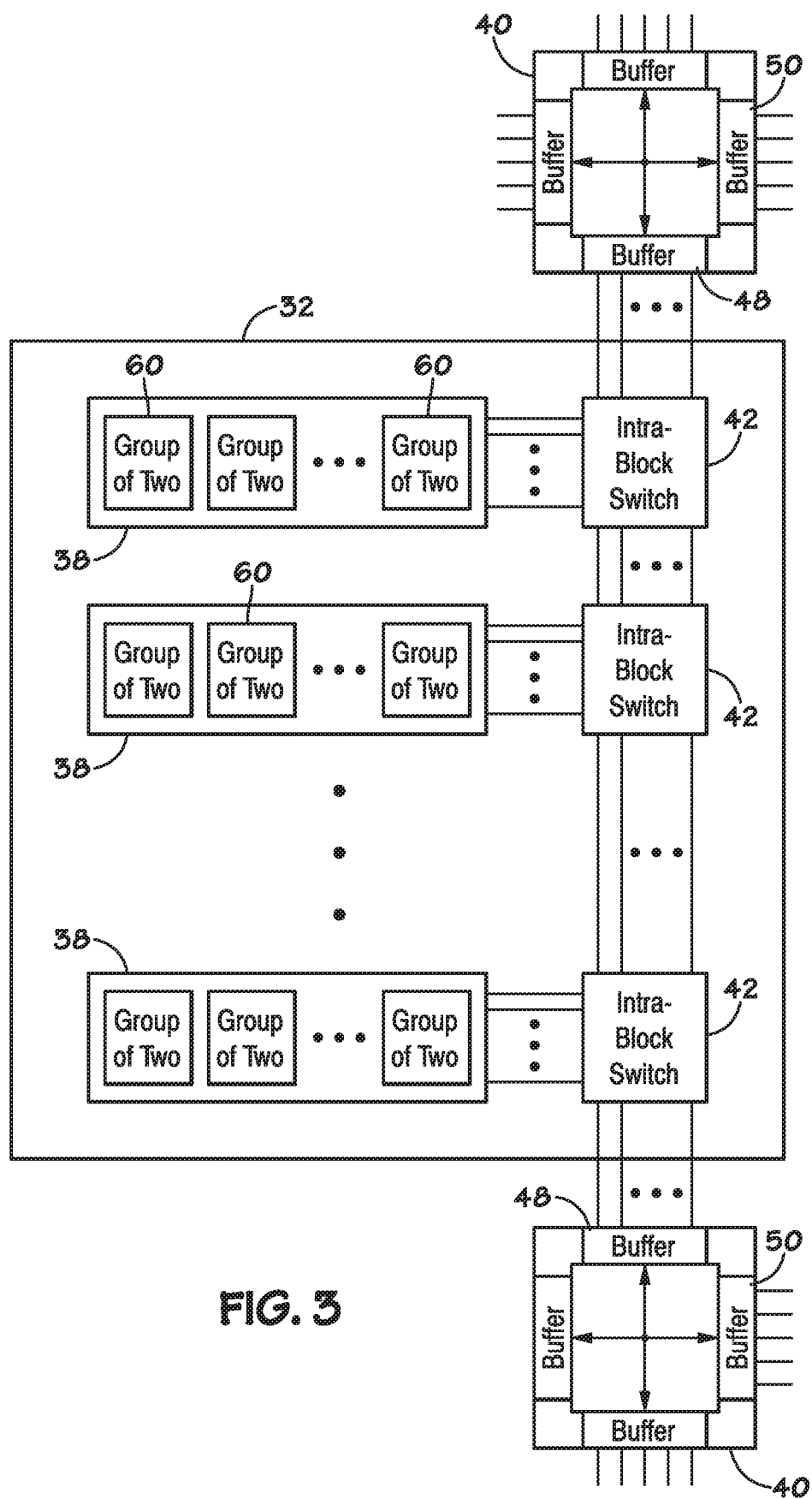
FIG. 3 illustrates an example of a block of the FSM lattice of FIG. 2, according to various embodiments.

FIG. 3 illustrates an example of a block 32. A block 32 can include a plurality of rows 38 that can be selectively coupled together with configurable intra-block switching elements 42. Additionally, a row 38 can be selectively coupled to another row 38 within another block 32 with the inter-block switching elements 40. A row 38 includes a plurality of STEs 34, 36 organized into pairs of configurable elements that are referred to herein as groups of two (GOTs) 60. In an example, a block 32 comprises sixteen (16) rows 38.

FIG. 4 illustrates an example of a row 38. A GOT 60 can be selectively coupled to other GOTs 60 and any other elements (e.g., a special purpose element 58) within the row 38 by configurable intra-row switching elements 44. A GOT 60 can also be coupled to other GOTs 60 in other rows 38 with the intra-block switching element 42, or other GOTs 60 in other blocks 32 with an inter-block switching element 40. In an example, a GOT 60 has a first and second input 62, 64, and an output 66. The first input 62 is coupled to a first STE 34 of the GOT 60 and the second input 64 is coupled to a second STE 36 of the GOT 60, as will be further illustrated with reference to FIG. 5.

In an example, the row 38 includes a first and second plurality of row interconnection conductors 68, 70. In an example, an input 62, 64 of a GOT 60 can be coupled to one or more row interconnection conductors 68, 70, and an output 66 can be coupled to one or more row interconnection conductor 68, 70. In an example, a first plurality of the row interconnection conductors 68 can be coupled to each STE 34, 36 of each GOT 60 within the row 38. A second plurality of the row interconnection conductors 70 can be coupled to only one STE 34, 36 of each GOT 60 within the row 38, but cannot be coupled to the other STE 34, 36 of the GOT 60. In an example, a first half of the second plurality of row interconnection conductors 70 can couple to first half of the STEs 34, 36 within a row 38 (one STE 34 from each GOT 60) and a second half of the second plurality of row interconnection conductors 70 can couple to a second half of the STEs 34, 36 within a row 38 (the other STE 34, 36 from each GOT 60), as will be better illustrated with respect to FIG. 5. The limited connectivity between the second plurality of row interconnection conductors 70 and the STEs 34, 36 is referred to herein as "parity". In an example, the row 38 can also include a special purpose element 58 such as a counter, a configurable Boolean logic element, look-up table, RAM, a field configurable gate array (FPGA), an application specific integrated circuit (ASIC), a configurable processor (e.g., a microprocessor), or other element for performing a special purpose function.

In an example, the special purpose element 58 comprises a counter (also referred to herein as counter 58). In an example, the counter 58 comprises a 12-bit configurable down counter. The 12-bit configurable counter 58 has a counting input, a reset input, and zero-count output. The counting input, when asserted, decrements the value of the counter 58 by one. The reset input, when asserted, causes the counter 58 to load an initial value from an associated register. For the 12-bit counter 58, up to a 12-bit number can be loaded in as the initial value. When the value of the counter 58 is decremented to zero (0), the zero-count output is asserted. The counter 58 also has at least two modes, pulse and hold. When the counter 58 is set to pulse mode, the zero-count output is asserted when the counter 58 reaches zero. For example, the zero-count output is asserted during the processing of an immediately subsequent next data byte, which results in the counter 58 being offset in time with respect to the input character cycle. After the next character cycle, the zero-count output is no longer asserted. In this manner, for example, in the pulse mode, the zero-count output is asserted for one input character processing cycle. When the counter 58 is set to hold mode the zero-count output is asserted during the clock cycle when the counter 58 decrements to zero, and stays asserted until the counter 58 is reset by the reset input being asserted.

In another example, the special purpose element 58 comprises Boolean logic. For example, the Boolean logic may be used to perform logical functions, such as AND, OR, NAND, NOR, Sum of Products (SoP), Negated-Output Sum of Products (NSoP), Negated-Output Product of Sume (NPoS), and Product of Sums (PoS) functions. This Boolean logic can be used to extract data from terminal state STEs (corresponding to terminal nodes of a FSM, as discussed later herein) in FSM lattice 30. The data extracted can be used to provide state data to other FSM lattices 30 and/or to provide configuring data used to reconfigure FSM lattice 30, or to reconfigure another FSM lattice 30.

Figure 4A:
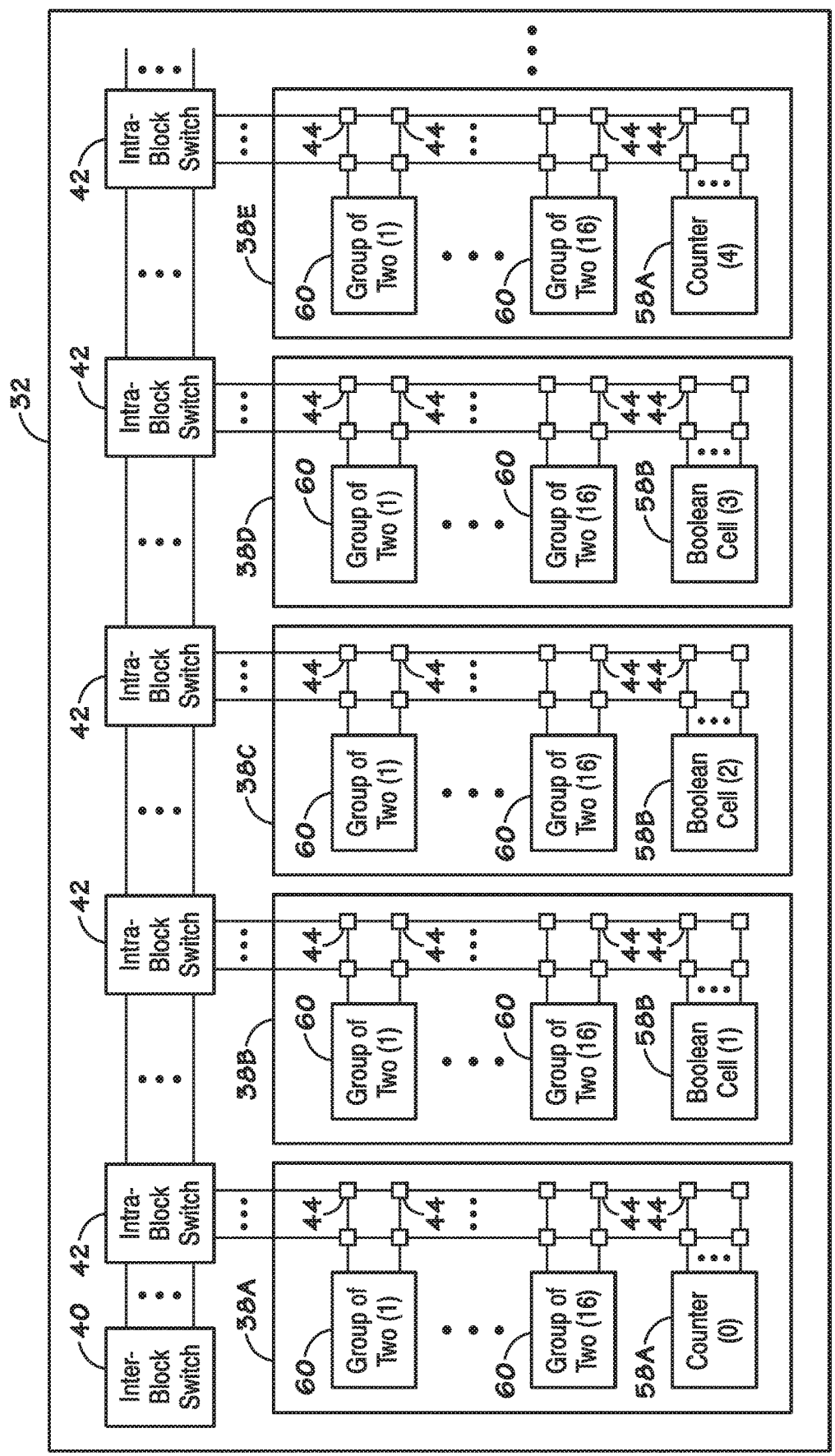
FIG. 4A illustrates a block as in FIG. 3 having counters in rows of the block, according to various embodiments of the invention.

FIG. 4A is an illustration of an example of a block 32 having rows 38 which each include the special purpose element 58. For example, the special purpose elements 58 in the block 32 may include counter cells 58A and Boolean logic cells 58B. While only the rows 38 in row positions 0 through 4 are illustrated in FIG. 4A (e.g., labeled 38A through 38E), each block 32 may have any number of rows 38 (e.g., 16 rows 38), and one or more special purpose elements 58 may be configured in each of the rows 38. For example, in one embodiment, counter cells 58A may be configured in certain rows 38 (e.g., in row positions 0, 4, 8, and 12), while the Boolean logic cells 58B may be configured in the remaining of the 16 rows 38 (e.g., in row positions 1, 2, 3, 5, 6, 7, 9, 10, 11, 13, 14, 15, and 16). The GOT 60 and the special purpose elements 58 may be selectively coupled (e.g., selectively connected) in each row 38 through intra-row switching elements 44, where each row 38 of the block 32 may be selectively coupled with any of the other rows 38 of the block 32 through intra-block switching elements 42.

In some embodiments, each active GOT 60 in each row 38 may output a signal indicating whether one or more conditions are detected (e.g., a search result is detected), and the special purpose element 58 in the row 38 may receive the GOT 60 output to determine whether certain quantifiers of the one or more conditions are met and/or count a number of times a condition is detected. For example, quantifiers of a count operation may include determining whether a condition was detected at least a certain number of times, determining whether a condition was detected no more than a certain number of times, determining whether a condition was detected exactly a certain number of times, and determining whether a condition was detected within a certain range of times.

Outputs from the counter 58A and/or the Boolean logic cell 58B may be communicated through the intra-row switching elements 44 and the intra-block switching elements 42 to perform counting or logic with greater complexity. For example, counters 58A may be configured to implement the quantifiers, such as asserting an output only when a condition is detected an exact number of times. Counters 58A in a block 32 may also be used concurrently, thereby increasing the total bit count of the combined counters to count higher numbers of a detected condition. Furthermore, in some embodiments, different special purpose elements 58 such as counters 58A and Boolean logic cells 58B may be used together. For example, an output of one or more Boolean logic cells 58B may be counted by one or more counters 58A in a block 32.

Figure 5:
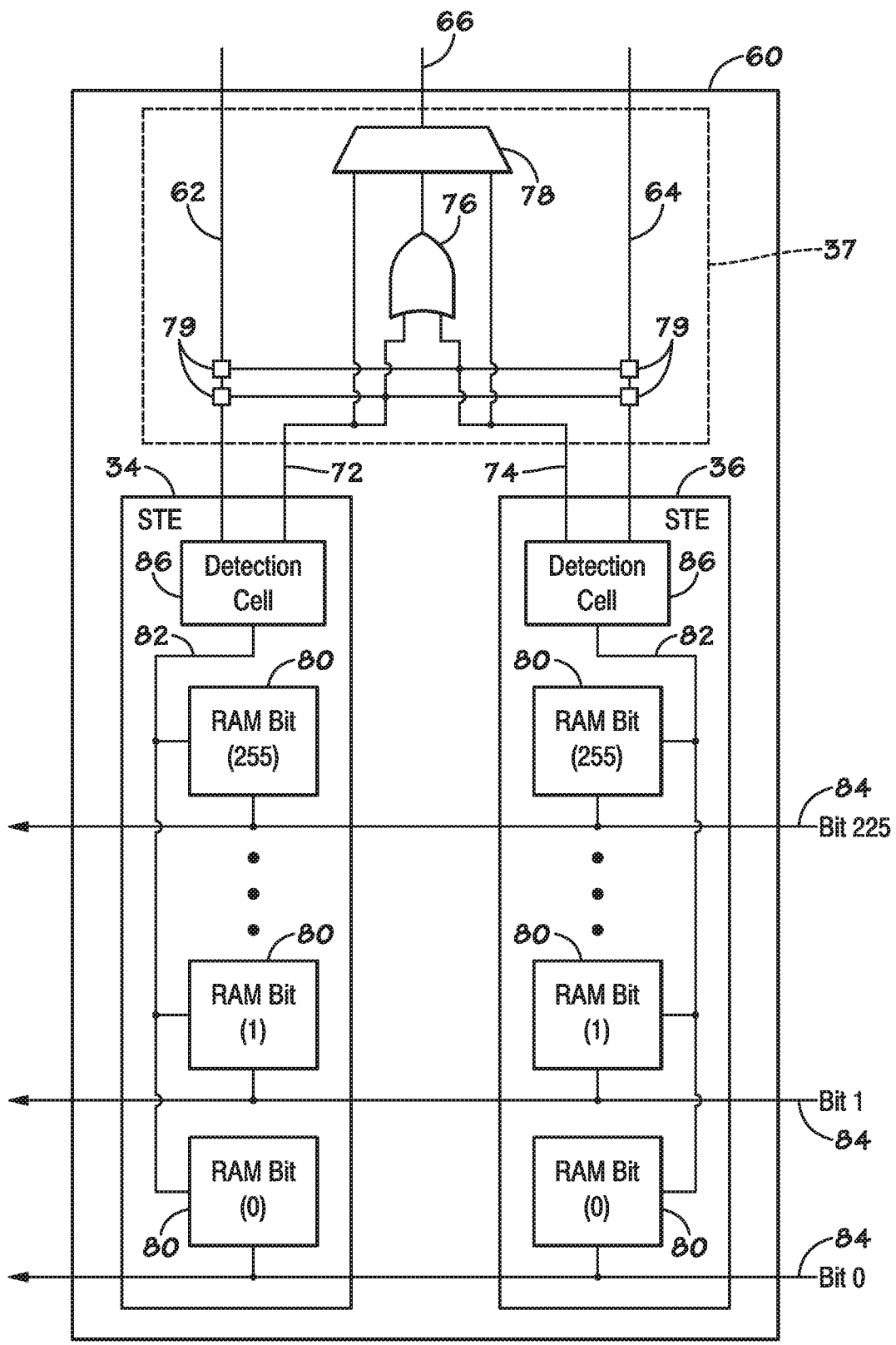
FIG. 5 illustrates an example of a Group of Two of the row of FIG. 4, according to embodiments.

FIG. 5 illustrates an example of a GOT 60. The GOT 60 includes a first STE 34, a second STE 36, and intra-group circuitry 37 coupled to the first STE 34 and the second STE 36. For example, the first STE 34 and the second STE 36 may have inputs 62, 64 and outputs 72, 74 coupled to an OR gate 76 and a 3-to-1 multiplexer 78 of the intra-group circuitry 37. The 3-to-1 multiplexer 78 can be set to couple the output 66 of the GOT 60 to either the first STE 34, the second STE 36, or the OR gate 76. The OR gate 76 can be used to couple together both outputs 72, 74 to form the common output 66 of the GOT 60. In an example, the first and second STE 34, 36 exhibit parity, as discussed above, where the input 62 of the first STE 34 can be coupled to some of the row interconnection conductors 68 and the input 64 of the second STE 36 can be coupled to other row interconnection conductors 70 the common output 66 may be produced which may overcome parity problems. In an example, the two STEs 34, 36 within a GOT 60 can be cascaded and/or looped back to themselves by setting either or both of switching elements 79. The STEs 34, 36 can be cascaded by coupling the output 72, 74 of the STEs 34, 36 to the input 62, 64 of the other STE 34, 36. The STEs 34, 36 can be looped back to themselves by coupling the output 72, 74 to their own input 62, 64. Accordingly, the output 72 of the first STE 34 can be coupled to neither, one, or both of the input 62 of the first STE 34 and the input 64 of the second STE 36. Additionally, as each of the inputs 62, 64 may be coupled to a plurality of row routing lines, an OR gate may be utilized to select any of the inputs from these row routing lines along inputs 62, 64, as well as the outputs 72, 74.

In an example, each state transition element 34, 36 comprises a plurality of memory cells 80, such as those often used in dynamic random access memory (DRAM), coupled in parallel to a detect line 82. One such memory cell 80 comprises a memory cell that can be set to a data state, such as one that corresponds to either a high or a low value (e.g., a 1 or 0). The output of the memory cell 80 is coupled to the detect line 82 and the input to the memory cell 80 receives signals based on data on the data stream line 84. In an example, an input at the input block 52 is decoded to select one or more of the memory cells 80. The selected memory cell 80 provides its stored data state as an output onto the detect line 82. For example, the data received at the input block 52 can be provided to a decoder (not shown) and the decoder can select one or more of the data stream lines 84. In an example, the decoder can convert an 8-bit ACSII character to the corresponding 1 of 256 data stream lines 84.

A memory cell 80, therefore, outputs a high signal to the detect line 82 when the memory cell 80 is set to a high value and the data on the data stream line 84 selects the memory cell 80. When the data on the data stream line 84 selects the memory cell 80 and the memory cell 80 is set to a low value, the memory cell 80 outputs a low signal to the detect line 82. The outputs from the memory cells 80 on the detect line 82 are sensed by a detection cell 86.

In an example, the signal on an input line 62, 64 sets the respective detection cell 86 to either an active or inactive state. When set to the inactive state, the detection cell 86 outputs a low signal on the respective output 72, 74 regardless of the signal on the respective detect line 82. When set to an active state, the detection cell 86 outputs a high signal on the respective output line 72, 74 when a high signal is detected from one of the memory cells 82 of the respective STE 34, 36. When in the active state, the detection cell 86 outputs a low signal on the respective output line 72, 74 when the signals from all of the memory cells 82 of the respective STE 34, 36 are low.

In an example, an STE 34, 36 includes 256 memory cells 80 and each memory cell 80 is coupled to a different data stream line 84. Thus, an STE 34, 36 can be programmed to output a high signal when a selected one or more of the data stream lines 84 have a high signal thereon. For example, the STE 34 can have a first memory cell 80 (e.g., bit 0) set high and all other memory cells 80 (e.g., bits 1-255) set low. When the respective detection cell 86 is in the active state, the STE 34 outputs a high signal on the output 72 when the data stream line 84 corresponding to bit 0 has a high signal thereon. In other examples, the STE 34 can be set to output a high signal when one of multiple data stream lines 84 have a high signal thereon by setting the appropriate memory cells 80 to a high value.

In an example, a memory cell 80 can be set to a high or low value by reading bits from an associated register. Accordingly, the STEs 34 can be configured by storing an image created by the compiler 20 into the registers and loading the bits in the registers into associated memory cells 80. In an example, the image created by the compiler 20 includes a binary image of high and low (e.g., 1 and 0) bits. The image can configure the FSM lattice 30 to implement a FSM by cascading the STEs 34, 36. For example, a first STE 34 can be set to an active state by setting the detection cell 86 to the active state. The first STE 34 can be set to output a high signal when the data stream line 84 corresponding to bit 0 has a high signal thereon. The second STE 36 can be initially set to an inactive state, but can be set to, when active, output a high signal when the data stream line 84 corresponding to bit 1 has a high signal thereon. The first STE 34 and the second STE 36 can be cascaded by setting the output 72 of the first STE 34 to couple to the input 64 of the second STE 36. Thus, when a high signal is sensed on the data stream line 84 corresponding to bit 0, the first STE 34 outputs a high signal on the output 72 and sets the detection cell 86 of the second STE 36 to an active state. When a high signal is sensed on the data stream line 84 corresponding to bit 1, the second STE 36 outputs a high signal on the output 74 to activate another STE 36 or for output from the FSM lattice 30.

In an example, a single FSM lattice 30 is implemented on a single physical device, however, in other examples two or more FSM lattices 30 can be implemented on a single physical device (e.g., physical chip). In an example, each FSM lattice 30 can include a distinct data input block 52, a distinct output block 54, a distinct programming interface 56, and a distinct set of configurable elements. Moreover, each set of configurable elements can react (e.g., output a high or low signal) to data at their corresponding data input block 52. For example, a first set of configurable elements corresponding to a first FSM lattice 30 can react to the data at a first data input block 52 corresponding to the first FSM lattice 30. A second set of configurable elements corresponding to a second FSM lattice 30 can react to a second data input block 52 corresponding to the second FSM lattice 30. Accordingly, each FSM lattice 30 includes a set of configurable elements, wherein different sets of configurable elements can react to different input data. Similarly, each FSM lattice 30, and each corresponding set of configurable elements can provide a distinct output. In some examples, an output block 54 from a first FSM lattice 30 can be coupled to an input block 52 of a second FSM lattice 30, such that input data for the second FSM lattice 30 can include the output data from the first FSM lattice 30 in a hierarchical arrangement of a series of FSM lattices 30.

In an example, an image for loading onto the FSM lattice 30 comprises a plurality of bits of data for configuring the configurable elements, the configurable switching elements, and the special purpose elements within the FSM lattice 30. In an example, the image can be loaded onto the FSM lattice 30 to configure the FSM lattice 30 to provide a desired output based on certain inputs. The output block 54 can provide outputs from the FSM lattice 30 based on the reaction of the configurable elements to data at the data input block 52. An output from the output block 54 can include a single bit indicating a search result of a given pattern, a word comprising a plurality of bits indicating search results and non-search results to a plurality of patterns, and a state vector corresponding to the state of all or certain configurable elements at a given moment. As described, a number of FSM lattices 30 may be included in a state machine engine, such as state machine engine 14, to perform data analysis, such as pattern-recognition (e.g., speech recognition, image recognition, etc.) signal processing, imaging, computer vision, cryptography, and others.

Figure 6:
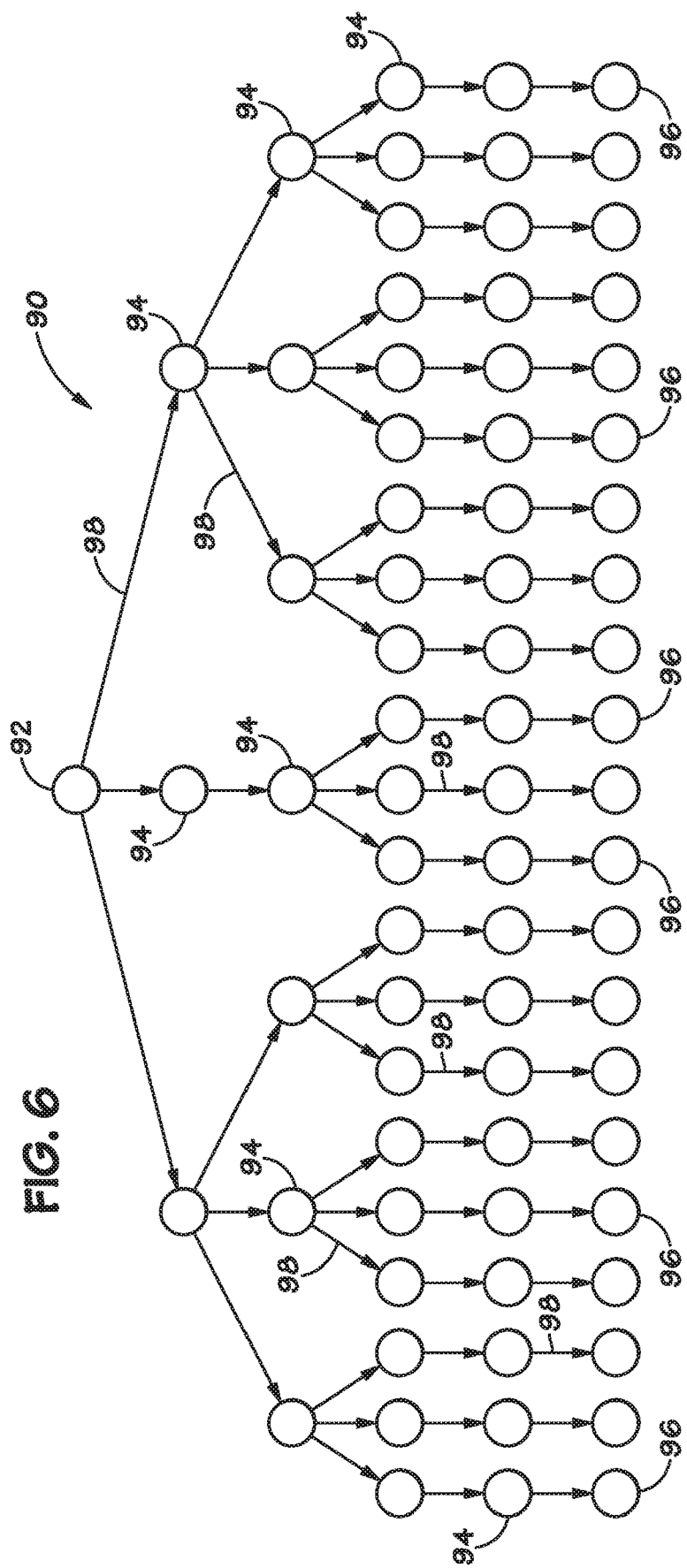
FIG. 6 illustrates an example of a finite state machine graph, according to various embodiments.

FIG. 6 illustrates an example model of a finite state machine (FSM) that can be implemented by the FSM lattice 30. The FSM lattice 30 can be configured (e.g., programmed) as a physical implementation of a FSM. A FSM can be represented as a diagram 90, (e.g., directed graph, undirected graph, pseudograph), which contains one or more root nodes 92. In addition to the root nodes 92, the FSM can be made up of several standard nodes 94 and terminal nodes 96 that are connected to the root nodes 92 and other standard nodes 94 through one or more edges 98. A node 92, 94, 96 corresponds to a state in the FSM. The edges 98 correspond to the transitions between the states.

Each of the nodes 92, 94, 96 can be in either an active or an inactive state. When in the inactive state, a node 92, 94, 96 does not react (e.g., respond) to input data. When in an active state, a node 92, 94, 96 can react to input data. An upstream node 92, 94 can react to the input data by activating a node 94, 96 that is downstream from the node when the input data matches criteria specified by an edge 98 between the upstream node 92, 94 and the downstream node 94, 96. For example, a first node 94 that specifies the character 'b' will activate a second node 94 connected to the first node 94 by an edge 98 when the first node 94 is active and the character 'b' is received as input data. As used herein, "upstream" refers to a relationship between one or more nodes, where a first node that is upstream of one or more other nodes (or upstream of itself in the case of a loop or feedback configuration) refers to the situation in which the first node can activate the one or more other nodes (or can activate itself in the case of a loop). Similarly, "downstream" refers to a relationship where a first node that is downstream of one or more other nodes (or downstream of itself in the case of a loop) can be activated by the one or more other nodes (or can be activated by itself in the case of a loop). Accordingly, the terms "upstream" and "downstream" are used herein to refer to relationships between one or more nodes, but these terms do not preclude the use of loops or other non-linear paths among the nodes.

In the diagram 90, the root node 92 can be initially activated and can activate downstream nodes 94 when the input data matches an edge 98 from the root node 92. Nodes 94 can activate nodes 96 when the input data matches an edge 98 from the node 94. Nodes 94, 96 throughout the diagram 90 can be activated in this manner as the input data is received. A terminal node 96 corresponds to a search result of a sequence of interest in the input data. Accordingly, activation of a terminal node 96 indicates that a sequence of interest has been received as the input data. In the context of the FSM lattice 30 implementing a pattern recognition function, arriving at a terminal node 96 can indicate that a specific pattern of interest has been detected in the input data.

In an example, each root node 92, standard node 94, and terminal node 96 can correspond to a configurable element in the FSM lattice 30. Each edge 98 can correspond to connections between the configurable elements. Thus, a standard node 94 that transitions to (e.g., has an edge 98 connecting to) another standard node 94 or a terminal node 96 corresponds to a configurable element that transitions to (e.g., provides an output to) another configurable element. In some examples, the root node 92 does not have a corresponding configurable element.

As will be appreciated, although the node 92 is described as a root node and nodes 96 are described as terminal nodes, there may not necessarily be a particular "start" or root node and there may not necessarily be a particular "end" or output node. In other words, any node may be a starting point and any node may provide output.

When the FSM lattice 30 is programmed, each of the configurable elements can also be in either an active or inactive state. A given configurable element, when inactive, does not react to the input data at a corresponding data input block 52. An active configurable element can react to the input data at the data input block 52, and can activate a downstream configurable element when the input data matches the setting of the configurable element. When a configurable element corresponds to a terminal node 96, the configurable element can be coupled to the output block 54 to provide an indication of a search result to an external device.

An image loaded onto the FSM lattice 30 via the programming interface 56 can configure the configurable elements and special purpose elements, as well as the connections between the configurable elements and special purpose elements, such that a desired FSM is implemented through the sequential activation of nodes based on reactions to the data at the data input block 52. In an example, a configurable element remains active for a single data cycle (e.g., a single character, a set of characters, a single clock cycle) and then becomes inactive unless re-activated by an upstream configurable element.

A terminal node 96 can be considered to store a compressed history of past search results. For example, the one or more patterns of input data required to reach a terminal node 96 can be represented by the activation of that terminal node 96. In an example, the output provided by a terminal node 96 is binary, for example, the output indicates whether a search result for a pattern of interest has been generated or not. The ratio of terminal nodes 96 to standard nodes 94 in a diagram 90 may be quite small. In other words, although there may be a high complexity in the FSM, the output of the FSM may be small by comparison.

In an example, the output of the FSM lattice 30 can comprise a state vector. The state vector comprises the state (e.g., activated or not activated) of configurable elements of the FSM lattice 30. In another example, the state vector can include the state of all or a subset of the configurable elements whether or not the configurable elements corresponds to a terminal node 96. In an example, the state vector includes the states for the configurable elements corresponding to terminal nodes 96. Thus, the output can include a collection of the indications provided by all terminal nodes 96 of a diagram 90. The state vector can be represented as a word, where the binary indication provided by each terminal node 96 comprises one bit of the word. This encoding of the terminal nodes 96 can provide an effective indication of the detection state (e.g., whether and what sequences of interest have been detected) for the FSM lattice 30.

As mentioned above, the FSM lattice 30 can be programmed to implement a pattern recognition function. For example, the FSM lattice 30 can be configured to recognize one or more data sequences (e.g., signatures, patterns) in the input data. When a data sequence of interest is recognized by the FSM lattice 30, an indication of that recognition can be provided at the output block 54. In an example, the pattern recognition can recognize a string of symbols (e.g., ASCII characters) to, for example, identify malware or other data in network data.

Figure 7:
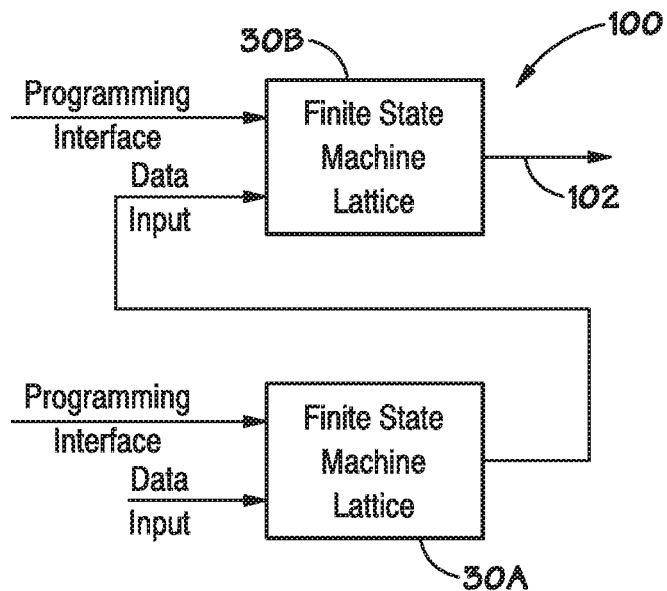
FIG. 7 illustrates an example of two-level hierarchy implemented with FSM lattices, according to various embodiments.

FIG. 7 illustrates an example of hierarchical structure 100, wherein two levels of FSM lattices 30 are coupled in series and used to analyze data. Specifically, in the illustrated embodiment, the hierarchical structure 100 includes a first FSM lattice 30A and a second FSM lattice 30B arranged in series. Each FSM lattice 30 includes a respective data input block 52 to receive data input, a programming interface block 56 to receive configuring signals and an output block 54.

The first FSM lattice 30A is configured to receive input data, for example, raw data at a data input block. The first FSM lattice 30A reacts to the input data as described above and provides an output at an output block. The output from the first FSM lattice 30A is sent to a data input block of the second FSM lattice 30B. The second FSM lattice 30B can then react based on the output provided by the first FSM lattice 30A and provide a corresponding output signal 102 of the hierarchical structure 100. This hierarchical coupling of two FSM lattices 30A and 30B in series provides a means to provide data regarding past search results in a compressed word from a first FSM lattice 30A to a second FSM lattice 30B. The data provided can effectively be a summary of complex matches (e.g., sequences of interest) that were recorded by the first FSM lattice 30A.

Figure 7A:
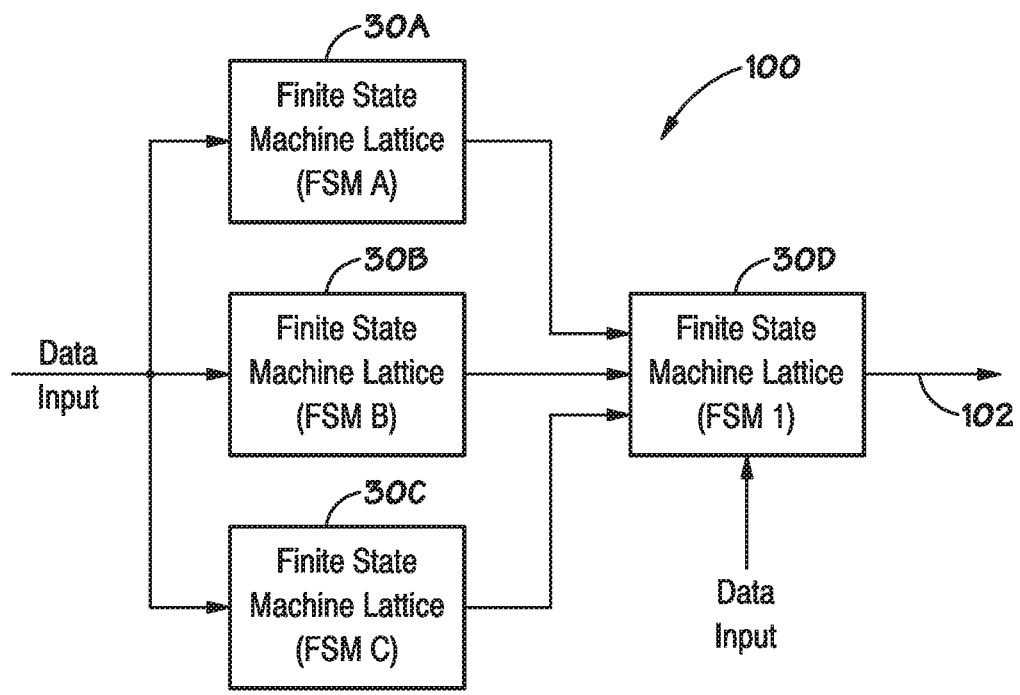
FIG. 7A illustrates a second example of two-level hierarchy implemented with FSM lattices, according to various embodiments.

FIG. 7A illustrates a second two-level hierarchy 100 of FSM lattices 30A, 30B, 30C, and 30D, which allows the overall FSM 100 (inclusive of all or some of FSM lattices 30A, 30B, 30C, and 30D) to perform two independent levels of analysis of the input data. The first level (e.g., FSM lattice 30A, FSM lattice 30B, and/or FSM lattice 30C) analyzes the same data stream, which includes data inputs to the overall FSM 100. The outputs of the first level (e.g., FSM lattice 30A, FSM lattice 30B, and/or FSM lattice 30C) become the inputs to the second level, (e.g., FSM lattice 30D). FSM lattice 30D performs further analysis of the combination the analysis already performed by the first level (e.g., FSM lattice 30A, FSM lattice 30B, and/or FSM lattice 30C). By connecting multiple FSM lattices 30A, 30B, and 30C together, increased knowledge about the data stream input may be obtained by FSM lattice 30D.

The first level of the hierarchy (implemented by one or more of FSM lattice 30A, FSM lattice 30B, and FSM lattice 30C) can, for example, perform processing directly on a raw data stream. For example, a raw data stream can be received at an input block 52 of the first level FSM lattices 30A, 30B, and/or 30C and the configurable elements of the first level FSM lattices 30A, 30B, and/or 30C can react to the raw data stream. The second level (implemented by the FSM lattice 30D) of the hierarchy can process the output from the first level. For example, the second level FSM lattice 30D receives the output from an output block 54 of the first level FSM lattices 30A, 30B, and/or 30C at an input block 52 of the second level FSM lattice 30D and the configurable elements of the second level FSM lattice 30D can react to the output of the first level FSM lattices 30A, 30B, and/or 30C. Accordingly, in this example, the second level FSM lattice 30D does not receive the raw data stream as an input, but rather receives the indications of search results for patterns of interest that are generated from the raw data stream as determined by one or more of the first level FSM lattices 30A, 30B, and/or 30C. Thus, the second level FSM lattice 30D can implement a FSM 100 that recognizes patterns in the output data stream from the one or more of the first level FSM lattices 30A, 30B, and/or 30C. However, it should also be appreciated that the second level FSM lattice 30D can additionally receive the raw data stream as an input, for example, in conjunction with the indications of search results for patterns of interest that are generated from the raw data stream as determined by one or more of the first level FSM lattices 30A, 30B, and/or 30C. It should be appreciated that the second level FSM lattice 30D may receive inputs from multiple other FSM lattices in addition to receiving output from the one or more of the first level FSM lattices 30A, 30B, and/or 30C. Likewise, the second level FSM lattice 30D may receive inputs from other devices. The second level FSM lattice 30D may combine these multiple inputs to produce outputs. Finally, while only two levels of FSM lattices 30A, 30B, 30C, and 30D are illustrated, it is envisioned that additional levels of FSM lattices may be stacked such that there are, for example, three, four, 10, 100, or more levels of FSM lattices.

Figure 8:
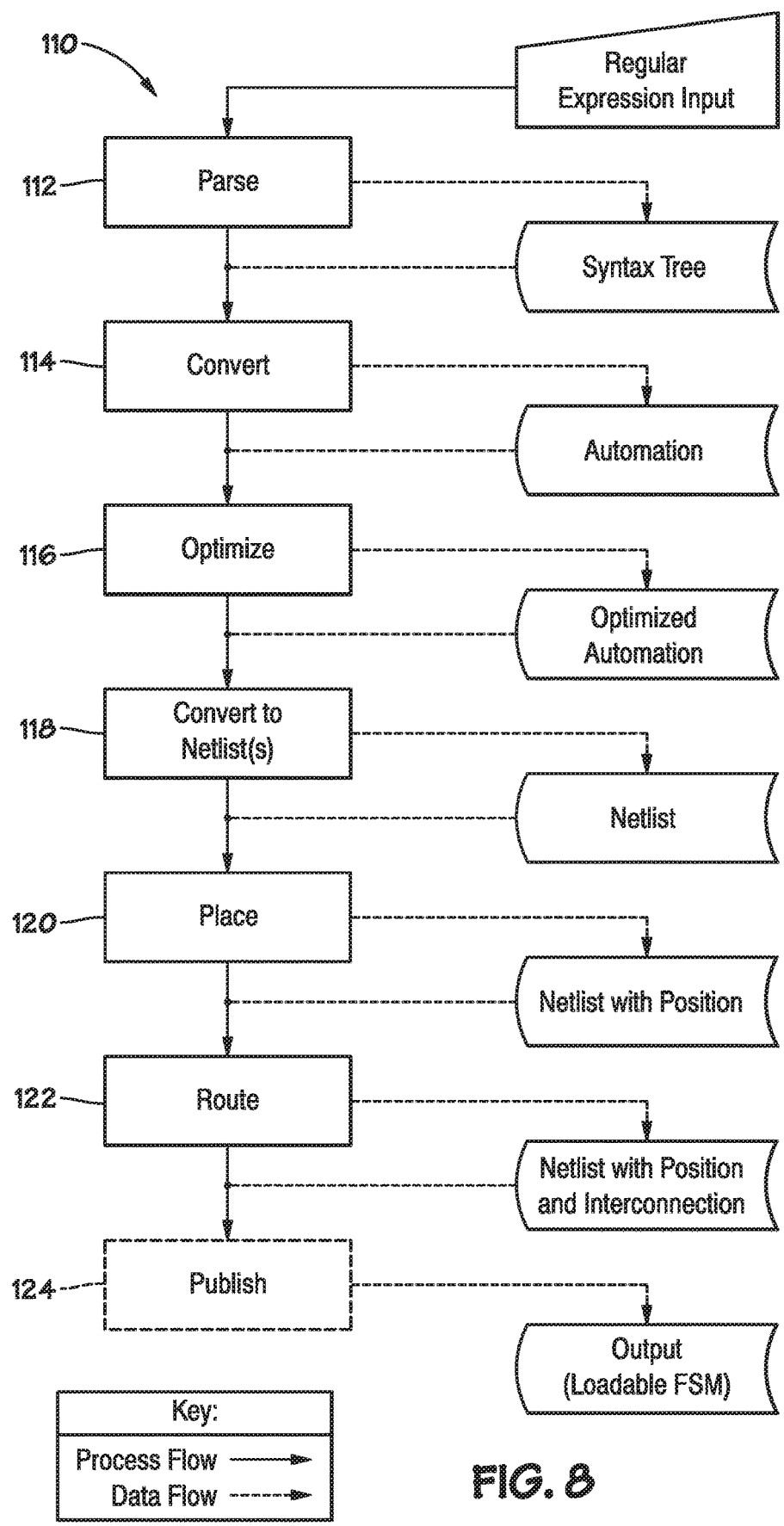
FIG. 8 illustrates an example of a method for a compiler to convert source code into a binary file for programming of the FSM lattice of FIG. 2, according to various embodiments.

FIG. 8 illustrates an example of a method 110 for a compiler to convert source code into an image used to configure a FSM lattice, such as lattice 30, to implement a FSM. Method 110 includes parsing the source code into a syntax tree (block 112), converting the syntax tree into an automaton (block 114), optimizing the automaton (block 116), converting the automaton into a netlist (block 118), placing the netlist on hardware (block 120), routing the netlist (block 122), and publishing the resulting image (block 124).

In an example, the compiler 20 includes an application programming interface (API) that allows software developers to create images for implementing FSMs on the FSM lattice 30. The compiler 20 provides methods to convert an input set of regular expressions in the source code into an image that is configured to configure the FSM lattice 30. The compiler 20 can be implemented by instructions for a computer having a von Neumann architecture. These instructions can cause a processor 12 on the computer to implement the functions of the compiler 20. For example, the instructions, when executed by the processor 12, can cause the processor 12 to perform actions as described in blocks 112, 114, 116, 118, 120, 122, and 124 on source code that is accessible to the processor 12.

In an example, the source code describes search strings for identifying patterns of symbols within a group of symbols. To describe the search strings, the source code can include a plurality of regular expressions (regexes). A regex can be a string for describing a symbol search pattern. Regexes are widely used in various computer domains, such as programming languages, text editors, network security, and others. In an example, the regular expressions supported by the compiler include criteria for the analysis of unstructured data. Unstructured data can include data that is free form and has no indexing applied to words within the data. Words can include any combination of bytes, printable and non-printable, within the data. In an example, the compiler can support multiple different source code languages for implementing regexes including Perl, (e.g., Perl compatible regular expressions (PCRE)), PHP, Java, and .NET languages.

At block 112 the compiler 20 can parse the source code to form an arrangement of relationally connected operators, where different types of operators correspond to different functions implemented by the source code (e.g., different functions implemented by regexes in the source code). Parsing source code can create a generic representation of the source code. In an example, the generic representation comprises an encoded representation of the regexs in the source code in the form of a tree graph known as a syntax tree. The examples described herein refer to the arrangement as a syntax tree (also known as an "abstract syntax tree") in other examples, however, a concrete syntax tree as part of the abstract syntax tree, a concrete syntax tree in place of the abstract syntax tree, or other arrangement can be used.

Since, as mentioned above, the compiler 20 can support multiple languages of source code, parsing converts the source code, regardless of the language, into a non-language specific representation, e.g., a syntax tree. Thus, further processing (blocks 114, 116, 118, 120) by the compiler 20 can work from a common input structure regardless of the language of the source code.

As noted above, the syntax tree includes a plurality of operators that are relationally connected. A syntax tree can include multiple different types of operators. For example, different operators can correspond to different functions implemented by the regexes in the source code.

At block 114, the syntax tree is converted into an automaton. An automaton comprises a software model of a FSM which may, for example, comprise a plurality of states. In order to convert the syntax tree into an automaton, the operators and relationships between the operators in the syntax tree are converted into states with transitions between the states. Moreover, in one embodiment, conversion of the automaton is accomplished based on the hardware of the FSM lattice 30.

In an example, input symbols for the automaton include the symbols of the alphabet, the numerals 0-9, and other printable characters. In an example, the input symbols are represented by the byte values 0 through 255 inclusive. In an example, an automaton can be represented as a directed graph where the nodes of the graph correspond to the set of states. In an example, a transition from state p to state q on an input symbol α, i.e. δ(p, α), is shown by a directed connection from node p to node q. In an example, a reversal of an automaton produces a new automaton where each transition p→q on some symbol α is reversed q→p on the same symbol. In a reversal, start states become final states and the final states become start states. In an example, the language recognized (e.g., matched) by an automaton is the set of all possible character strings which when input sequentially into the automaton will reach a final state. Each string in the language recognized by the automaton traces a path from the start state to one or more final states.

At block 116, after the automaton is constructed, the automaton is optimized to reduce its complexity and size, among other things. The automaton can be optimized by combining redundant states.

At block 118, the optimized automaton is converted into a netlist. Converting the automaton into a netlist maps each state of the automaton to a hardware element (e.g., STEs 34, 36, other elements) on the FSM lattice 30, and determines the connections between the hardware elements.

At block 120, the netlist is placed to select a specific hardware element of the target device (e.g., STEs 34, 36, special purpose elements 58) corresponding to each node of the netlist. In an example, placing selects each specific hardware element based on general input and output constraints for of the FSM lattice 30.

At block 122, the placed netlist is routed to determine the settings for the configurable switching elements (e.g., inter-block switching elements 40, intra-block switching elements 42, and intra-row switching elements 44) in order to couple the selected hardware elements together to achieve the connections describe by the netlist. In an example, the settings for the configurable switching elements are determined by determining specific conductors of the FSM lattice 30 that will be used to connect the selected hardware elements, and the settings for the configurable switching elements. Routing can take into account more specific limitations of the connections between the hardware elements than can be accounted for via the placement at block 120. Accordingly, routing may adjust the location of some of the hardware elements as determined by the global placement in order to make appropriate connections given the actual limitations of the conductors on the FSM lattice 30.

Once the netlist is placed and routed, the placed and routed netlist can be converted into a plurality of bits for configuring a FSM lattice 30. The plurality of bits are referred to herein as an image (e.g., binary image).

At block 124, an image is published by the compiler 20. The image comprises a plurality of bits for configuring specific hardware elements of the FSM lattice 30. The bits can be loaded onto the FSM lattice 30 to configure the state of STEs 34, 36, the special purpose elements 58, and the configurable switching elements such that the programmed FSM lattice 30 implements a FSM having the functionality described by the source code. Placement (block 120) and routing (block 122) can map specific hardware elements at specific locations in the FSM lattice 30 to specific states in the automaton. Accordingly, the bits in the image can configure the specific hardware elements to implement the desired function(s). In an example, the image can be published by saving the machine code to a computer readable medium. In another example, the image can be published by displaying the image on a display device. In still another example, the image can be published by sending the image to another device, such as a configuring device for loading the image onto the FSM lattice 30. In yet another example, the image can be published by loading the image onto a FSM lattice (e.g., the FSM lattice 30).

In an example, an image can be loaded onto the FSM lattice 30 by either directly loading the bit values from the image to the STEs 34, 36 and other hardware elements or by loading the image into one or more registers and then writing the bit values from the registers to the STEs 34, 36 and other hardware elements. In an example, the hardware elements (e.g., STEs 34, 36, special purpose elements 58, configurable switching elements 40, 42, 44) of the FSM lattice 30 are memory mapped such that a configuring device and/or computer can load the image onto the FSM lattice 30 by writing the image to one or more memory addresses.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Figure 9:
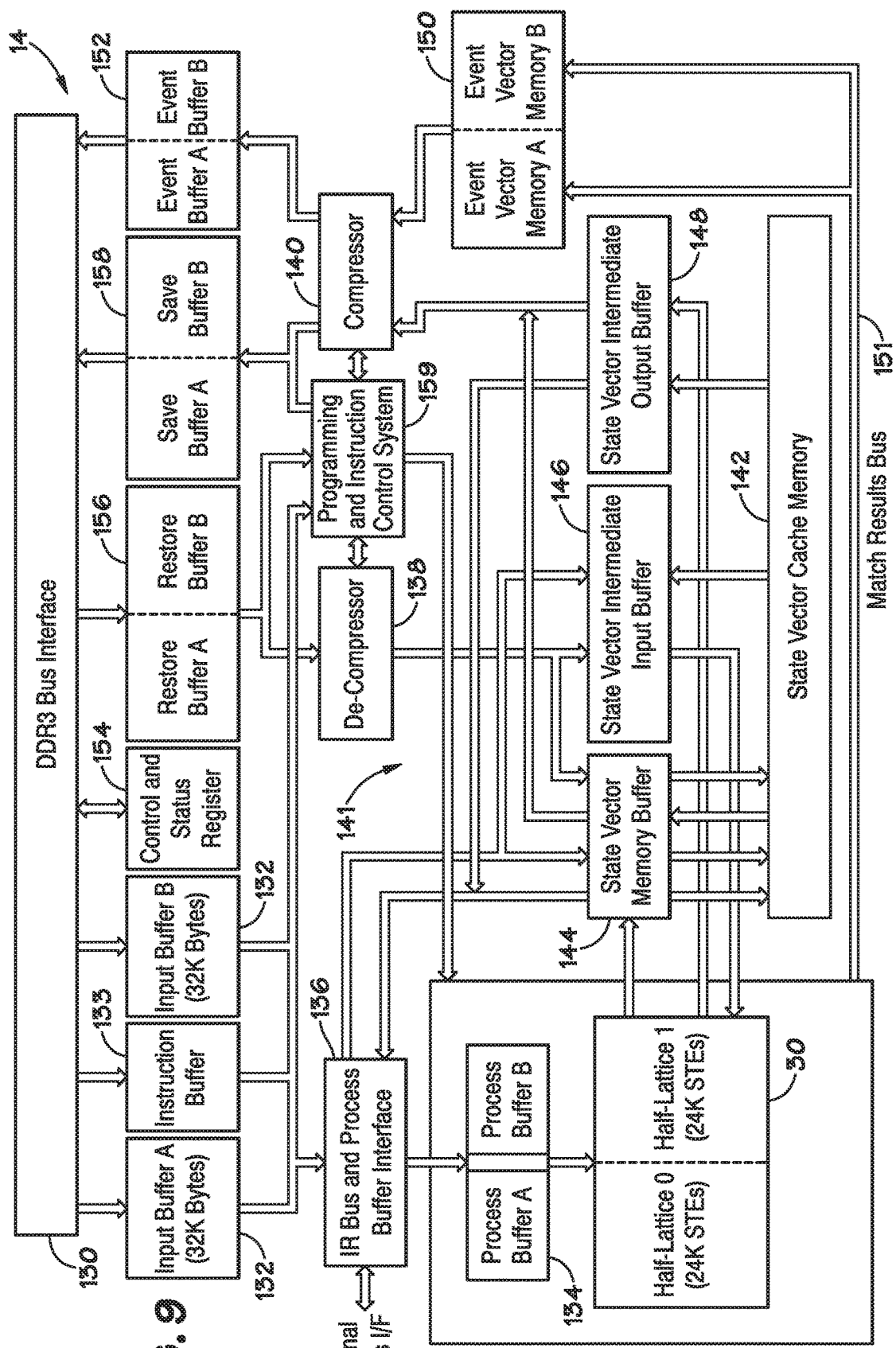
FIG. 9 illustrates a state machine engine, according to various embodiments.

Referring now to FIG. 9, an embodiment of the state machine engine 14 (e.g., a single device on a single chip) is illustrated. As previously described, the state machine engine 14 is configured to receive data from a source, such as the memory 16 over a data bus. In the illustrated embodiment, data may be sent to the state machine engine 14 through a bus interface, such as a double data rate three (DDR3) bus interface 130. The DDR3 bus interface 130 may be capable of exchanging (e.g., providing and receiving)

data at a rate greater than or equal to 1 GByte/sec. Such a data exchange rate may be greater than a rate that data is analyzed by the state machine engine 14. As will be appreciated, depending on the source of the data to be analyzed, the bus interface 130 may be any suitable bus interface for exchanging data to and from a data source to the state machine engine 14, such as a NAND Flash interface, peripheral component interconnect (PCI) interface, gigabit media independent interface (GMMI), etc. As previously described, the state machine engine 14 includes one or more FSM lattices 30 configured to analyze data. Each FSM lattice 30 may be divided into two half-lattices. In the illustrated embodiment, each half lattice may include 24K STEs (e.g., STEs 34, 36), such that the lattice 30 includes 48K STEs. The lattice 30 may comprise any desirable number of STEs, arranged as previously described with regard to FIGS. 2-5. Further, while only one FSM lattice 30 is illustrated, the state machine engine 14 may include multiple FSM lattices 30, as previously described.

Data to be analyzed may be received at the bus interface 130 and provided to the FSM lattice 30 through a number of buffers and buffer interfaces. In the illustrated embodiment, the data path includes input buffers 132, an instruction buffer 133, process buffers 134, and an inter-rank (IR) bus and process buffer interface 136. The input buffers 132 are configured to receive and temporarily store data to be analyzed. In one embodiment, there are two input buffers 132 (input buffer A and input buffer B). Data may be stored in one of the two data input 132, while data is being emptied from the other input buffer 132, for analysis by the FSM lattice 30. The bus interface 130 may be configured to provide data to be analyzed to the input buffers 132 until the input buffers 132 are full. After the input buffers 132 are full, the bus interface 130 may be configured to be free to be used for other purpose (e.g., to provide other data from a data stream until the input buffers 132 are available to receive additional data to be analyzed). In the illustrated embodiment, the input buffers 132 may be 32 KBytes each. The instruction buffer 133 is configured to receive instructions from the processor 12 via the bus interface 130, such as instructions that correspond to the data to be analyzed and instructions that correspond to configuring the state machine engine 14. The IR bus and process buffer interface 136 may facilitate providing data to the process buffer 134. The IR bus and process buffer interface 136 can be used to ensure that data is processed by the FSM lattice 30 in order. The IR bus and process buffer interface 136 may coordinate the exchange of data, timing data, packing instructions, etc. such that data is received and analyzed correctly. Generally, the IR bus and process buffer interface 136 allows the analyzing of multiple data sets in parallel through a logical rank of FSM lattices 30. For example, multiple physical devices (e.g., state machine engines 14, chips, separate devices) may be arranged in a rank and may provide data to each other via the IR bus and process buffer interface 136. For purposes of this application the term "rank" refers to a set of state machine engines 14 connected to the same chip select. In the illustrated embodiment, the IR bus and process buffer interface 136 may include a 32 bit data bus. In other embodiments, the IR bus and process buffer interface 136 may include any suitable data bus, such as a 128 bit data bus.

In the illustrated embodiment, the state machine engine 14 also includes a de-compressor 138 and a compressor 140 to aid in providing state vector data through the state machine engine 14. The compressor 140 and de-compressor 138 work in conjunction such that the state vector data can be compressed to minimize the data providing times. By compressing the state vector data, the bus utilization time may be minimized. The compressor 140 and de-compressor 138 can also be configured to handle state vector data of varying burst lengths. By padding compressed state vector data and including an indicator as to when each compressed region ends, the compressor 140 may improve the overall processing speed through the state machine engine 14. The compressor 140 may be used to compress results data after analysis by the FSM lattice 30. The compressor 140 and de-compressor 138 may also be used to compress and decompress configuration data. In one embodiment, the compressor 140 and de-compressor 138 may be disabled (e.g., turned off) such that data flowing to and/or from the compressor 140 and de-compressor 138 is not modified.

As previously described, an output of the FSM lattice 30 can comprise a state vector. The state vector comprises the state (e.g., activated or not activated) of the STEs 34, 36 of the FSM lattice 30 and the dynamic (e.g., current) count of the counter 58. The state machine engine 14 includes a state vector system 141 having a state vector cache memory 142, a state vector memory buffer 144, a state vector intermediate input buffer 146, and a state vector intermediate output buffer 148. The state vector system 141 may be used to store multiple state vectors of the FSM lattice 30 and to provide a state vector to the FSM lattice 30 to restore the FSM lattice 30 to a state corresponding to the provided state vector. For example, each state vector may be temporarily stored in the state vector cache memory 142. For example, the state of each STE 34, 36 may be stored, such that the state may be restored and used in further analysis at a later time, while freeing the STEs 34, 36 for further analysis of a new data set (e.g., search terms). Like a typical cache, the state vector cache memory 142 allows storage of state vectors for quick retrieval and use, here by the FSM lattice 30, for instance. In the illustrated embodiment, the state vector cache memory 142 may store up to 512 state vectors.

As will be appreciated, the state vector data may be exchanged between different state machine engines 14 (e.g., chips) in a rank. The state vector data may be exchanged between the different state machine engines 14 for various purposes such as: to synchronize the state of the STEs 34, 36 of the FSM lattices 30 of the state machine engines 14, to perform the same functions across multiple state machine engines 14, to reproduce results across multiple state machine engines 14, to cascade results across multiple state machine engines 14, to store a history of states of the STEs 34, 36 used to analyze data that is cascaded through multiple state machine engines 14, and so forth. Furthermore, it should be noted that within a state machine engine 14, the state vector data may be used to quickly configure the STEs 34, 36 of the FSM lattice 30. For example, the state vector data may be used to restore the state of the STEs 34, 36 to an initialized state (e.g., to prepare for a new input data set), or to restore the state of the STEs 34, 36 to prior state (e.g., to continue searching of an interrupted or "split" input data set). In certain embodiments, the state vector data may be provided to the bus interface 130 so that the state vector data may be provided to the processor 12 (e.g., for analysis of the state vector data, reconfiguring the state vector data to apply modifications, reconfiguring the state vector data to improve efficiency of the STEs 34, 36, and so forth).

For example, in certain embodiments, the state machine engine 14 may provide cached state vector data (e.g., data stored by the state vector system 141) from the FSM lattice 30 to an external device. The external device may receive the state vector data, modify the state vector data, and provide the modified state vector data to the state machine engine 14 for configuring the FSM lattice 30. Accordingly, the external device may modify the state vector data so that the state machine engine 14 may skip states (e.g., jump around) as desired.

The state vector cache memory 142 may receive state vector data from any suitable device. For example, the state vector cache memory 142 may receive a state vector from the FSM lattice 30, another FSM lattice 30 (e.g., via the IR bus and process buffer interface 136), the de-compressor 138, and so forth. In the illustrated embodiment, the state vector cache memory 142 may receive state vectors from other devices via the state vector memory buffer 144. Furthermore, the state vector cache memory 142 may provide state vector data to any suitable device. For example, the state vector cache memory 142 may provide state vector data to the state vector memory buffer 144, the state vector intermediate input buffer 146, and the state vector intermediate output buffer 148.

Additional buffers, such as the state vector memory buffer 144, state vector intermediate input buffer 146, and state vector intermediate output buffer 148, may be utilized in conjunction with the state vector cache memory 142 to accommodate rapid retrieval and storage of state vectors, while processing separate data sets with interleaved packets through the state machine engine 14. In the illustrated embodiment, each of the state vector memory buffer 144, the state vector intermediate input buffer 146, and the state vector intermediate output buffer 148 may be configured to temporarily store one state vector. The state vector memory buffer 144 may be used to receive state vector data from any suitable device and to provide state vector data to any suitable device. For example, the state vector memory buffer 144 may be used to receive a state vector from the FSM lattice 30, another FSM lattice 30 (e.g., via the IR bus and process buffer interface 136), the de-compressor 138, and the state vector cache memory 142. As another example, the state vector memory buffer 144 may be used to provide state vector data to the IR bus and process buffer interface 136 (e.g., for other FSM lattices 30), the compressor 140, and the state vector cache memory 142.

Likewise, the state vector intermediate input buffer 146 may be used to receive state vector data from any suitable device and to provide state vector data to any suitable device. For example, the state vector intermediate input buffer 146 may be used to receive a state vector from an FSM lattice 30 (e.g., via the IR bus and process buffer interface 136), the de-compressor 138, and the state vector cache memory 142. As another example, the state vector intermediate input buffer 146 may be used to provide a state vector to the FSM lattice 30. Furthermore, the state vector intermediate output buffer 148 may be used to receive a state vector from any suitable device and to provide a state vector to any suitable device. For example, the state vector intermediate output buffer 148 may be used to receive a state vector from the FSM lattice 30 and the state vector cache memory 142. As another example, the state vector intermediate output buffer 148 may be used to provide a state vector to an FSM lattice 30 (e.g., via the IR bus and process buffer interface 136) and the compressor 140.

Once a result of interest is produced by the FSM lattice 30, an event vector may be stored in a event vector memory 150, whereby, for example, the event vector indicates at least one search result (e.g., detection of a pattern of interest). The event vector can then be sent to an event buffer 152 for transmission over the bus interface 130 to the processor 12, for example. As previously described, the results may be compressed. The event vector memory 150 may include two memory elements, memory element A and memory element B, each of which contains the results obtained by processing the input data in the corresponding input buffers 132 (e.g., input buffer A and input buffer B). In one embodiment, each of the memory elements may be DRAM memory elements or any other suitable storage devices. In some embodiments, the memory elements may operate as initial buffers to buffer the event vectors received from the FSM lattice 30, along results bus 151. For example, memory element A may receive event vectors, generated by processing the input data from input buffer A, along results bus 151 from the FSM lattice 30. Similarly, memory element B may receive event vectors, generated by processing the input data from input buffer B, along results bus 151 from the FSM lattice 30.

In one embodiment, the event vectors provided to the results memory 150 may indicate that a final result has been found by the FSM lattice 30. For example, the event vectors may indicate that an entire pattern has been detected. Alternatively, the event vectors provided to the results memory 150 may indicate, for example, that a particular state of the FSM lattice 30 has been reached. For example, the event vectors provided to the results memory 150 may indicate that one state (i.e., one portion of a pattern search) has been reached, so that a next state may be initiated. In this way, the event vector 150 may store a variety of types of results.

In some embodiments, IR bus and process buffer interface 136 may provide data to multiple FSM lattices 30 for analysis. This data may be time multiplexed. For example, if there are eight FSM lattices 30, data for each of the eight FSM lattices 30 may be provided to all of eight IR bus and process buffer interfaces 136 that correspond to the eight FSM lattices 30. Each of the eight IR bus and process buffer interfaces 136 may receive an entire data set to be analyzed. Each of the eight IR bus and process buffer interfaces 136 may then select portions of the entire data set relevant to the FSM lattice 30 associated with the respective IR bus and process buffer interface 136. This relevant data for each of the eight FSM lattices 30 may then be provided from the respective IR bus and process buffer interfaces 136 to the respective FSM lattice 30 associated therewith.

The event vector 150 may operate to correlate each received result with a data input that generated the result. To accomplish this, a respective result indicator may be stored corresponding to, and in some embodiments, in conjunction with, each event vector received from the results bus 151. In one embodiment, the result indicators may be a single bit flag. In another embodiment, the result indicators may be a multiple bit flag. If the result indicators may include a multiple bit flag, the bit positions of the flag may indicate, for example, a count of the position of the input data stream that corresponds to the event vector, the lattice that the event vectors correspond to, a position in set of event vectors, or other identifying information. These results indicators may include one or more bits that identify each particular event vector and allow for proper grouping and transmission of event vectors, for example, to compressor 140. Moreover, the ability to identify particular event vectors by their respective results indicators may allow for selective output of desired event vectors from the event vector memory 150. For example, only particular event vectors generated by the FSM lattice 30 may be selectively latched as an output. These result indicators may allow for proper grouping and provision of results, for example, to compressor 140. Moreover, the ability to identify particular event vectors by their respective result indicators allow for selective output of desired event vectors from the result memory 150. Thus, only particular event vectors provided by the FSM lattice 30 may be selectively provided to compressor 140.

Additional registers and buffers may be provided in the state machine engine 14, as well. In one embodiment, for example, a buffer may store information related to more than one process whereas a register may store information related to a single process. For instance, the state machine engine 14 may include control and status registers 154. In addition, a program buffer system (e.g., restore buffers 156) may be provided for initializing the FSM lattice 30. For example, initial (e.g., starting) state vector data may be provided from the program buffer system to the FSM lattice 30 (e.g., via the de-compressor 138). The de-compressor 138 may be used to decompress configuration data (e.g., state vector data, routing switch data, STE 34, 36 states, Boolean function data, counter data, match MUX data) provided to program the FSM lattice 30.

Similarly, a repair map buffer system (e.g., save buffers 158) may also be provided for storage of data (e.g., save maps) for setup and usage. The data stored by the repair map buffer system may include data that corresponds to repaired hardware elements, such as data identifying which STEs 34, 36 were repaired. The repair map buffer system may receive data via any suitable manner. For example, data may be provided from a "fuse map" memory, which provides the mapping of repairs done on a device during final manufacturing testing, to the save buffers 158. As another example, the repair map buffer system may include data used to modify (e.g., customize) a standard programming file so that the standard programming file may operate in a FSM lattice 30 with a repaired architecture (e.g., bad STEs 34, 36 in a FSM lattice 30 may be bypassed so they are not used). The compressor 140 may be used to compress data provided to the save buffers 158 from the fuse map memory. As illustrated, the bus interface 130 may be used to provide data to the restore buffers 156 and to provide data from the save buffers 158. As will be appreciated, the data provided to the restore buffers 156 and/or provided from the save buffers 158 may be compressed. In some embodiments, data is provided to the bus interface 130 and/or received from the bus interface 130 via a device external to the state machine engine 14 (e.g., the processor 12, the memory 16, the compiler 20, and so forth). The device external to the state machine engine 14 may be configured to receive data provided from the save buffers 158, to store the data, to analyze the data, to modify the data, and/or to provide new or modified data to the restore buffers 156.

The state machine engine 14 includes a lattice programming and instruction control system 159 used to configure (e.g., program) the FSM lattice 30 as well as provide inserted instructions, as will be described in greater detail below. As illustrated, the lattice programming and instruction control system 159 may receive data (e.g., configuration instructions) from the instruction buffer 133. Furthermore, the lattice programming and instruction control system 159 may receive data (e.g., configuration data) from the restore buffers 156. The lattice programming and instruction control system 159 may use the configuration instructions and the configuration data to configure the FSM lattice 30 (e.g., to configure routing switches, STEs 34, 36, Boolean cells, counters, match MUX) and may use the inserted instructions to correct errors during the operation of the state machine engine 14. The lattice programming and instruction control system 159 may also use the de-compressor 138 to de-compress data and the compressor 140 to compress data (e.g., for data exchanged with the restore buffers 156 and the save buffers 158).

Figure 10:
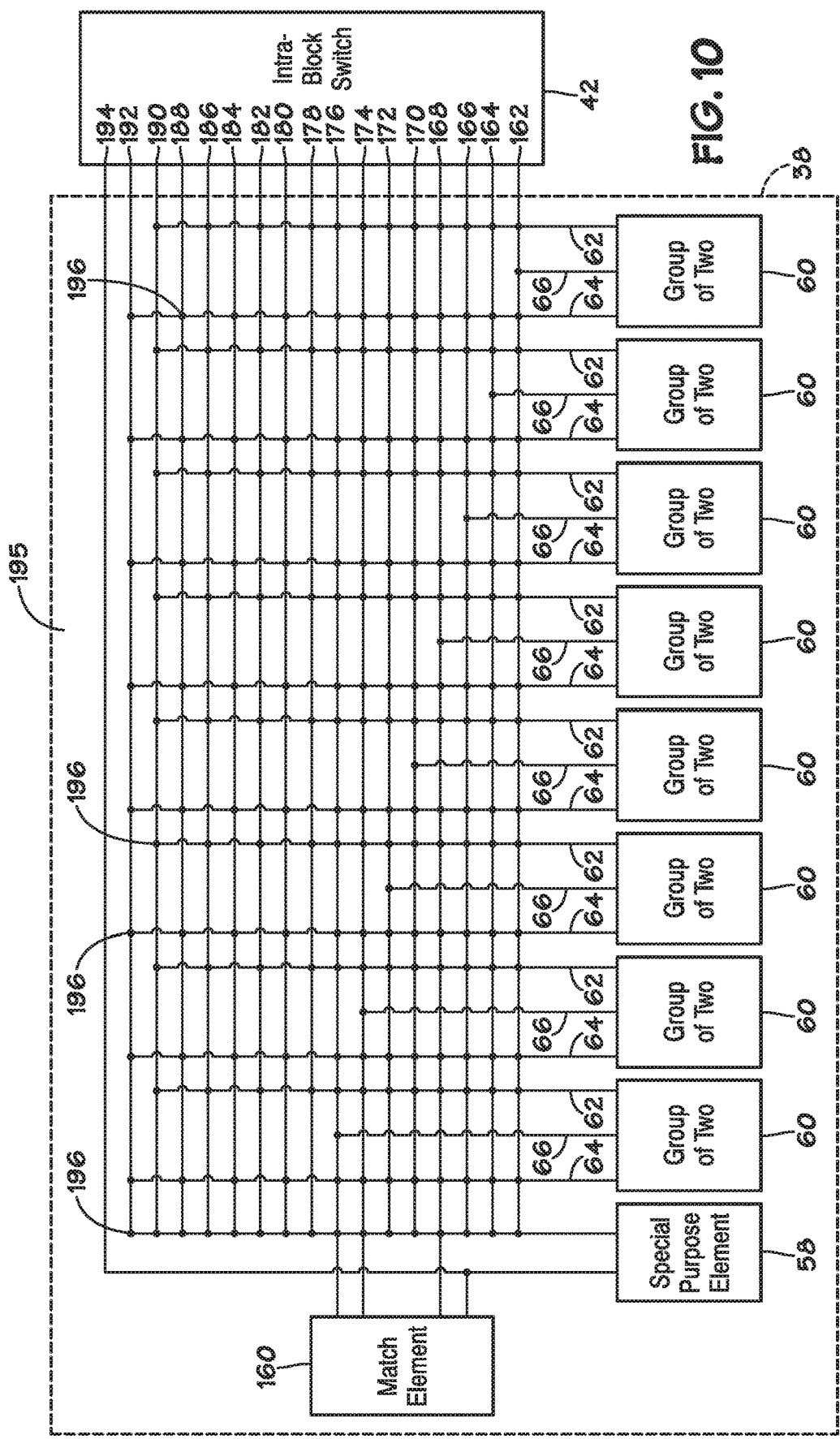
FIG. 10 illustrates a second example of a row of the block of FIG. 3, according to various embodiments of the invention.

Turning to FIG. 10, a second example of a row 38 similar to that discussed above with respect to FIG. 4 is illustrated. The row 38 may include configurable intra-row switching elements 44 and row interconnection/interconnect conductors 68, 70 (which can also be referred to as "row routing lines", as described below).

Row 38 of FIG. 10 may include eight GOTS 60, a special purpose element 58, inputs 62, inputs 64, outputs 66, a match element 160, a plurality of row routing lines 162, 164, 166, 168, 170, 172, 174, 176, 178, 180, 182, 184, 186, 188, 190, and 192 (collectively referred to hereafter as "row routing lines 162-192"), a special purpose element routing line 194, and a plurality of junction points 196. In an example row routing lines 162-192 illustrate a more detailed example of the row interconnection conductors 68, 70 of, for example, FIG. 4. Additionally, the row routing lines 162-192, the special purpose element routing line 194, and the plurality of junction points 196 may be collectively referred to as a local routing matrix 195. Thus, the local routing matrix 195 may be coupled to all pairs of SMEs 34, 36 for the GOTs 60 in a particular row 38.

The GOTS 60 and the special purpose element 58 illustrated in FIG. 10 are substantially similar to the GOTS 60 and the special purpose element 58 previously discussed with respect to FIG. 4. Accordingly, each GOT 60 receives an input 62, which may be a unified enable input, to operate as an enable signal for a detection cell 86 of a SME 34. Likewise, each GOT 60 also receives an input 64, which may also be a unified enable input, to operate as an enable signal for a detection cell 86 of a SME 36. These unified enable inputs 62, 64 may activate the detection cells 86 of the SMEs 34, 36 to output a respective result of an analysis performed by the respective SME, for example, at least one search result in an analyzed data stream from a single SME 34, which may be utilized in conjunction with results from other SMEs 34, 36 to, for example, search for a pattern in a data stream. For example, unified enable input 62 and unified enable input 64 allow for selective activation of the SMEs 34, 36 so that results generated by each of the active SMEs 34, 36 may be utilized as part of an overall broader analysis of a data stream.

The result generated by an SME 34, 36 of a GOT 60 may be selectively provided from the GOT on output 66. In one embodiment, the possible outputs of the GOT 60 may include no output, an output of the first SME 34, i.e., output 72, an output of the second SME 36, i.e., output 74, or the output of the first SME 34 or the output of the second SME 36, i.e., output 72 or output 74. Thus, a GOT 60 may be programmed to output a selected result from a GOT 60. This programming may be accomplished, for example, based on a loaded image performed during an initial programming stage of the FSM lattice 30. Results from the GOTs 60 may be provided to a match element 160, which may operate to output a selected result generated from the row 38 for a given data stream search or a portion of a data stream search.

Additionally, row 38 may include row routing lines 162-192 (which may also be referred to as row interconnection/interconnect conductors). In the present embodiment, there are sixteen row lines 162-192 that are selectively able to be coupled to eight GOTS 60 and to the special purpose element 58. However, it should be appreciated that fewer or more row routing lines may be utilized in conjunction with the row 38.

Each of the row routing lines 162-192 may be utilized to provide enable signals for any of the SMEs 34, 36 of one or more GOTS 60 along inputs 62, 64. Accordingly, through use of these row routing lines 162-192, any particular detection cell 86 for any particular SME (e.g., SME 34) may be activated. This may be accomplished by selectively coupling (e.g., in accordance with a loaded image) the row routing lines 162-192 to unified enable inputs 62, 64 of the SMEs 34, 36. Moreover, to provide further flexibility in providing enable signals to the SMEs 34, 36, the row routing lines 162-192 may be divided up amongst two SMEs 34, 36 of a given GOT 60. For example, row routing lines 162, 164, 166, 168, 170, 172, 174, and 176, may be utilized to activate any of the SMEs 34, 36 in the row 38. For example, a GOT 60 may transmit an output 66 to the row routing line coupled thereto, for example, row routing line 162. This signal may be transmitted into the intra-block switch, where it may be routed, for example, on row routing line 164 to an additional GOT 60 in the row 38. Additionally, row routing lines 178, 182, 186, and 190 may activate SMEs 34 in row 38, for example, by receiving signals from intra-block switch 42, while row routing lines 180, 184, 188, and 192 may activate SMEs 36 in row 38 via, for example, signals received from the intra-block witch 42. In this manner, the overall number of row routing lines 162-192 may be reduced, while still allowing for overall flexibility and the ability to activate any detection cell 86 of any of the SMEs 34, 36 in a row 38.

As illustrated in FIG. 10, each of the row routing lines 162-192 includes a plurality of junction points 196. These junction points 196 may include all routing line crossings illustrated with a solid circle in FIG. 10 and may, for example, include the intra-row switching elements 44 of FIG. 3, since the junction points 196 may be utilized to selectively couple any GOT 60 to any other GOT 60, or any GOT 60 to any other element (e.g., a special purpose element 58) within the row 38 (or, for that matter, within another row and/or another block). However, these connections may be limited by available junction points 196. For example, each of row routing lines 162, 164, 166, 168, 170, 172, 174, and 176, may be utilized to activate any of the SMEs 34, 36 in the row 38. However, each of row routing lines 162, 164, 166, 168, 170, 172, 174, and 176 also are selectively able to be coupled to the output of a respective different one of the GOTs 60. For example, an output from any one of the GOTs 60 may only be provided from that GOT 60 on a respective one of the row routing lines 162, 164, 166, 168, 170, 172, 174, and 176 able to be coupled thereto. Thus, in one embodiment, because row routing lines 162, 164, 166, 168, 170, 172, 174, and 176 are able to be coupled to the outputs 66 of the GOTs 60, the row routing lines 162, 164, 166, 168, 170, 172, 174, and 176 may provide (e.g., drive-out) signals to the intra-block switch 42. In contrast, in one embodiment, row routing lines 178, 180, 182, 184, 186, 188, 190, and 192 may receive (e.g. be driven by) signals from the intra-block switch 42 that may be received from, for example, other rows 38 or blocks 32.

In addition to row routing lines 162-192, the row 38 may include a special purpose element routing line 194 coupled to a special purpose element 58. Similar to row routing lines 162, 164, 166, 168, 170, 172, 174, and 176, the special purpose routing line 194 may provide (e.g., drive-out) signals to the intra-block switch 42. In one embodiment, the special purpose element routing line 194 may also be able to be coupled to the match element 160. For example, if the special purpose element 58 comprises a counter, an output of the counter may be provided along the special purpose routing line 194. Similarly, if the special purpose element 58 includes a Boolean logic element, such as a Boolean cell, an output of the Boolean logic element may be provided along the special purpose routing line 194. Through the use of these special purpose elements, repetitive searches (e.g., find an element ten times) or cascaded searches (e.g., find elements x, y, and z) may be simplified into a single output that can be provided along the special purpose routing line 194 to either or both of the intra-block switch 42 and the match element 160.

Figure 11:
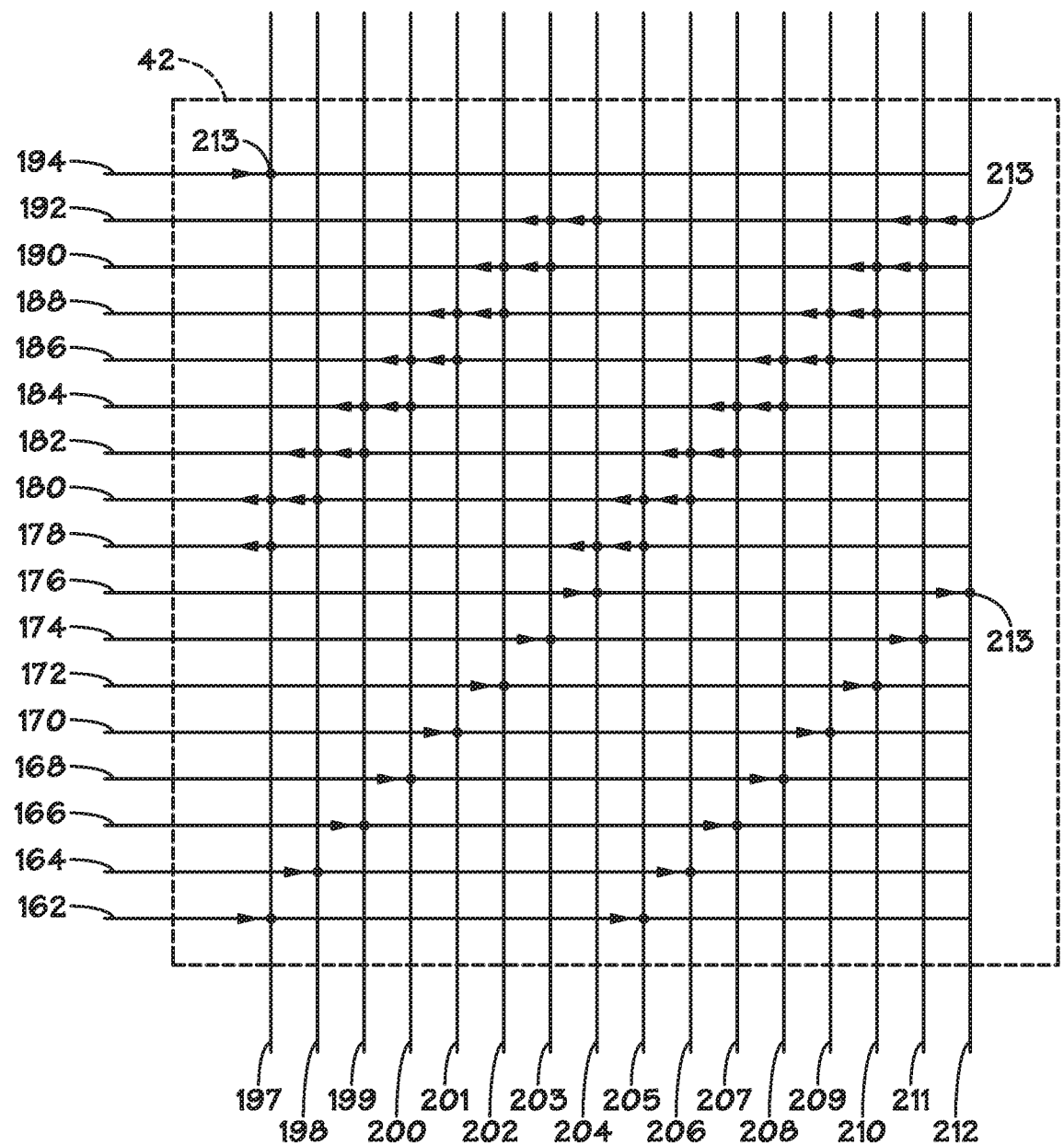
FIG. 11 illustrates the intra-block switch of FIG. 10, according to various embodiments of the invention.

A more detailed illustration of the intra-block switch 42 and its operation is presented in FIG. 11. As illustrated, the intra-block switch 42 may receive the row routing lines 162-192 as well as the special purpose element routing line 194, and these lines may intersect various block routing lines 197, 198, 199, 200, 201, 202, 203, 204, 205, 206, 207, 208, 209, 210, 211, and 212 (collectively referred to hereafter as "block routing lines 197-212") at a plurality of junction points 213. These junction points 213 may, for example, may be utilized to selectively couple row routing lines 162-192 to block routing lines 197-212. In one embodiment, each of row routing lines 162, 164, 166, 168, 170, 172, 174, and 176 may provide (e.g., drive-out, send, transmit, transfer, pass, etc.) signals to the intra-block switch 42, while row routing lines 178, 180, 182, 184, 186, 188, 190, and 192 may receive (e.g., drive-in) signals from the intra-block switch 42. Accordingly, row routing lines 162, 164, 166, 168, 170, 172, 174, and 176 may be utilized to provide signals from the row 38 coupled to the intra-block switch 42 in FIG. 10 to adjacent rows 38, such as those illustrated in FIG. 3. Additionally, row routing lines 162, 164, 166, 168, 170, 172, 174, and 176 may be utilized to provide signals from the row 38 coupled to the intra-block switch 42 in FIG. 10 to other rows 38 in the block 32 and/or to the block routing buffer 48. This may be accomplished by providing the signals generated in a given row 38 to one of the block routing lines 197-212 coupled thereto, since the block routing lines 197-212 are coupled to the various intra-block switches 42 and the block routing buffer 48 of FIG. 3. This may allow row 38 to provide any results generated therein to adjacent rows 38 or even other blocks 32.

Conversely, in one embodiment, each of the row routing lines 178, 180, 182, 184, 186, 188, 190, and 192 may receive (e.g., drive-in) signals from the intra-block switch 42. Accordingly, row routing lines 178, 180, 182, 184, 186, 188, 190, and 192 may be utilized to provide signals to the row 38 coupled to the intra-block switch 42 in FIG. 10 from adjacent rows 38, such as those illustrated in FIG. 3. Additionally or alternatively, row routing lines 178, 180, 182, 184, 186, 188, 190, and 192 may be utilized to provide signals from the row 38 coupled to the intra-block switch 42 in FIG. 10 from the block routing buffer 48. This may be accomplished by receiving signals generated in external blocks 32 or in adjacent rows 38 from one of the block routing lines 197-212 of FIG. 11, since the block routing lines 197-212 are coupled to the various intra-block switches 42 and the block routing buffer 48 of FIG. 3. This may allow row 38 to receive any results generated in adjacent rows 38 or even other blocks 32 along row routing lines 178, 180, 182, 184, 186, 188, 190, and 192. In this manner, the intra-block switch 42 may couple row 38 with adjacent rows 38 and other blocks 32. Moreover, as discussed above, results from any particular row 38 may be passed from one block 32 to another block 32. The block routing buffer 48 may facilitate this transfer of information between blocks.

In some embodiments, the row routing lines 162-192 and/or the block routing lines 197-212 may take up a substantial amount of area of the overall FSM lattice 30. Indeed, in SMEs 34, 36 may occupy as little as approximately 20%, approximately 15%, approximately 10%, approximately 5% or less of the area of a FSM lattice 30 with the remaining area taken up primarily by control circuitry and routing lines (e.g., row routing lines 162-192 and block routing lines 197-212). Accordingly, it may be desirable to reduce the overall amount of space dedicated to the routing lines of the FSM lattice 30 to allow for, for example, greater component density and/or overall reduction of the size of the FSM lattice 30. Techniques for reducing the amount of routing lines will be discussed in greater detail below.

Figures 12, 13:
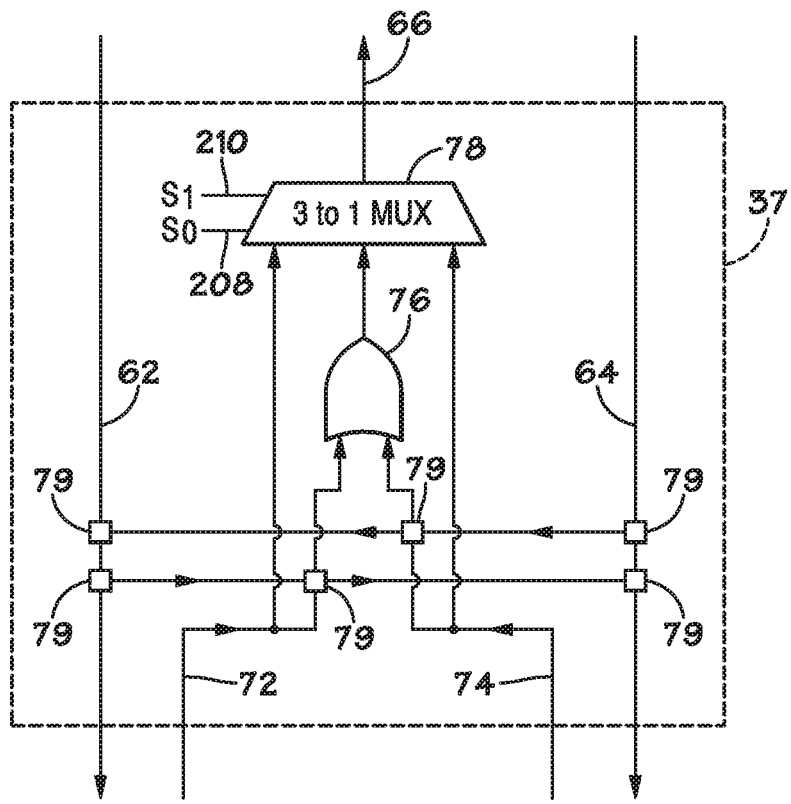
FIG. 12 illustrates the intra-group circuitry of FIG. 10, according to various embodiments of the invention.
FIG. 13 illustrates a truth table for the multiplexer of FIG. 12, according to various embodiments of the invention.

Returning to the GOT 60, it should be noted that the intra-group circuitry 37 of FIG. 12 may include elements of the GOT 60 previously discussed with respect to FIG. 5. The particular functionality and interconnection of these elements in the intra-group circuitry 37 will be discussed in greater detail with respect to FIG. 12.

The intra-group circuitry 37 in FIG. 12 includes inputs 62, 64 and outputs 72, 74, which have been previously shown to be coupled to SMEs 34, 36. It should be noted that the inputs 62, 64 and outputs 72, 74 are referred to with respect to their respective relationship to the SMEs 34, 36 and not necessarily their function in the intra-group circuitry 206. Additionally, the intra-group circuitry 37 includes an OR gate 76, a 3-to-1 multiplexer 78, and switching elements 79 coupled to outputs 72, 74, respectively. As illustrated, the switching element 79 coupled to output 72 may allow for the output 72 of SME 34 to be transmitted to the unified enable input 64 of the SME 36, for example, to allow for cascading searches to occur. Additionally or alternatively, the switching element 79 coupled to output 72 may allow for the unified enable input 62 of SME 34 to be transmitted to the unified enable input 64 of the SME 36 and/or the output 72 of the SME 34 to be transmitted to the OR gate 76. As previously discussed, allowing the unified enable input 62 of SME 34 to be transmitted to the unified enable input 64 of the SME 36 may allow for full addressing of all detection cell elements 86 in the SMEs 36 of a given row 38 via sharing of the row routing lines 174-204.

Similarly, the switching element 79 coupled to output 74 may allow for the output 74 of SME 36 to be transmitted to the unified enable input 62 of the SME 34, for example, to allow for cascading searches to occur. Additionally or alternatively, the switching element 79 coupled to output 74 may allow for the unified enable input 64 of SME 36 to be transmitted to the unified enable input 62 of the SME 34 and/or the output 74 of the SME 36 to be transmitted to the OR gate 76. Again, allowing the unified enable input 64 of SME 36 to be transmitted to the unified enable input 62 of the SME 34 may allow for full addressing of all detection cell elements 86 in the SMEs 34 of a given row 38 via sharing of the row routing lines 174-204. Additionally, it should be noted that the outputs 72, 74 can be looped back to the SMEs 34, 36 that generated the outputs 72, 74 by coupling the output 72 to input 62 via the illustrated switching elements 79 and coupling the output 77 to input 64 via the illustrated switching elements 79.

The 3-to-1 multiplexer 78 of the intra-group circuitry 206 can be set to couple the output 66 of the GOT 60 to either a first SME 34, a second SME 36, or the OR gate 76, which may be used to couple together both outputs 72, 74 of the SMEs 34, 36 to form the common output 66 of the GOT 60. Thus, the 3-to-1 multiplexer 78 may include a first output select input 208 and a second output select input 210. Thus, these output select inputs 208, 210 may programmably select what output is transmitted on output 66. This programming may be accomplished, for example, based on a loaded image performed during an initial programming stage of the FSM lattice 30. In other embodiment, the programming of the output select inputs 208, 210 may be accomplished, for example, based on dynamic programming instructions received during operation of the state machine engine 14 from the programming and instruction control system 159. FIG. 13 illustrates a truth table that sets forth an example of how the output select inputs 208, 210 may programmably select the output 66 of the GOT 60.

As shown in FIG. 13, when both output select inputs 208, 210 are low (i.e., 0), the output 66 of the GOT 60 will be a high impedance signal, thus effectively preventing any value from being transmitted on output 66. When output select input 208 is high (i.e., 1) and output select input 210 is low, the output 66 of the GOT 60 will be the output of the first SME 34, i.e., output 72. When output select input 208 is low and output select input 210 is high, the output 66 of the GOT 60 will be the output of the second SME 346, i.e., output 74. Finally, when output select inputs 208, 210 are high, the output 66 of the GOT 60 will be the output of the OR gate 76, i.e., output 72 logically ORed with output 74. In this manner, the 3-to-1 multiplexer 78 programmably select no output, output 72, output 74, or output 72 logically ORed with output 74 as the output 66 of the GOT 60. Furthermore, it should be noted that the 3-to-1 multiplexer may operate in other configurable configurations.

Indeed one such configurable configuration allows for the output select inputs 208, 210 to programmably select the output 66 of the GOT 60 in conjunction with a time-division multiplexing feature of the state machine engine 14. For example, the output select inputs 208, 210 may actively control when an output is transmitted for each of the GOTs 60 within the row 38. In this manner, the output 66 of each of the GOTs 60 of a row 38 may share a single (common) row routing line (e.g., row routing line 162) by transmitting, in turn, outputs from output 66 to the common row routing line. For example, each of the GOTs 60 may utilize the routing line coupled thereto (e.g., row routing line 162) for a respective time period. In some embodiments, the respective time periods may be equal for each GOT 60 coupled to the common routing line. In other embodiments, the respective time periods may different for each GOT 60 coupled to the common routing line and may be based, for example, on the size and/or determined importance of a result being transmitted from output 66.

Figure 14:
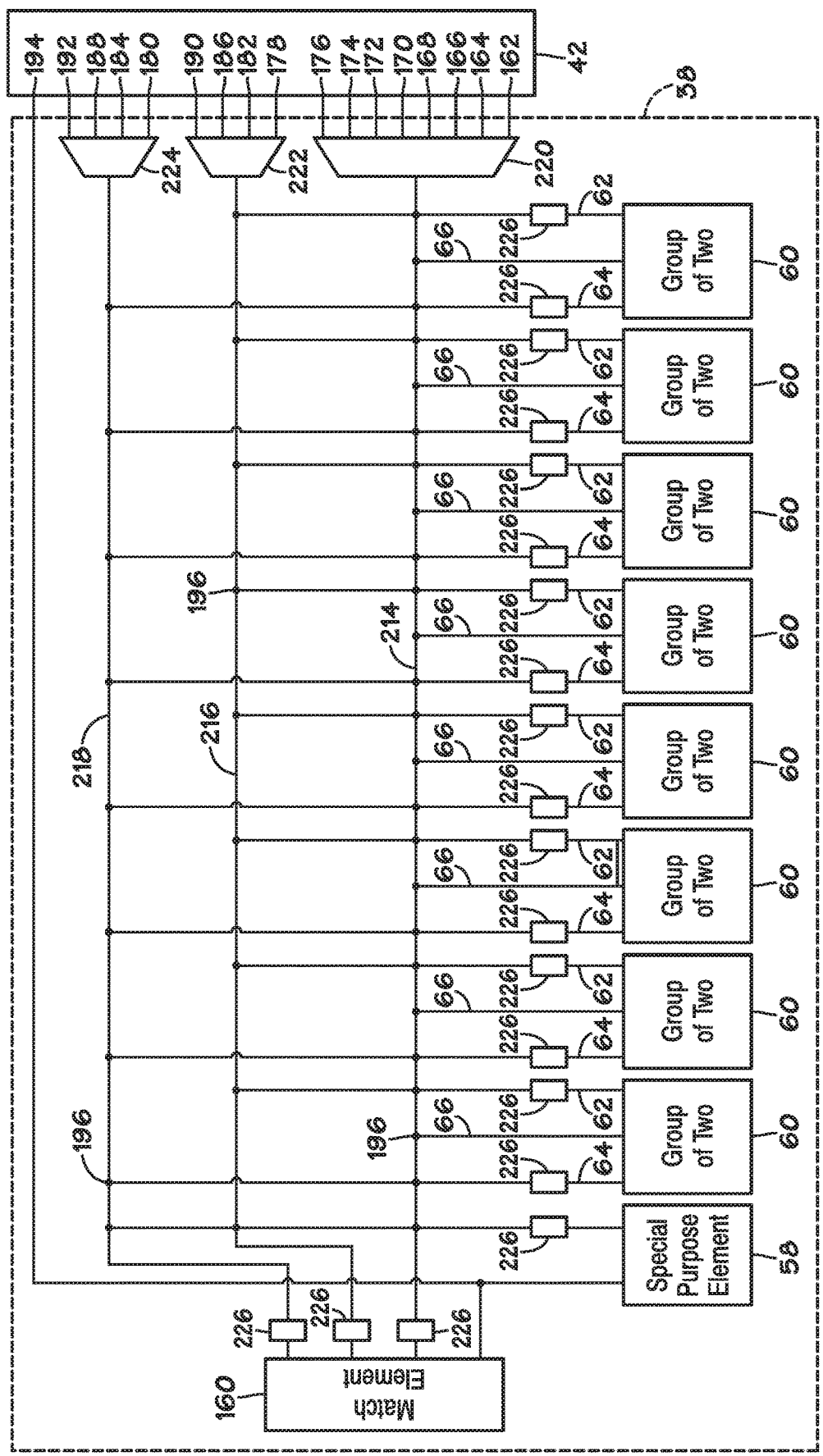
FIG. 14 illustrates a third example of a row of the block of FIG. 3, according to various embodiments of the invention.
Figure 15:
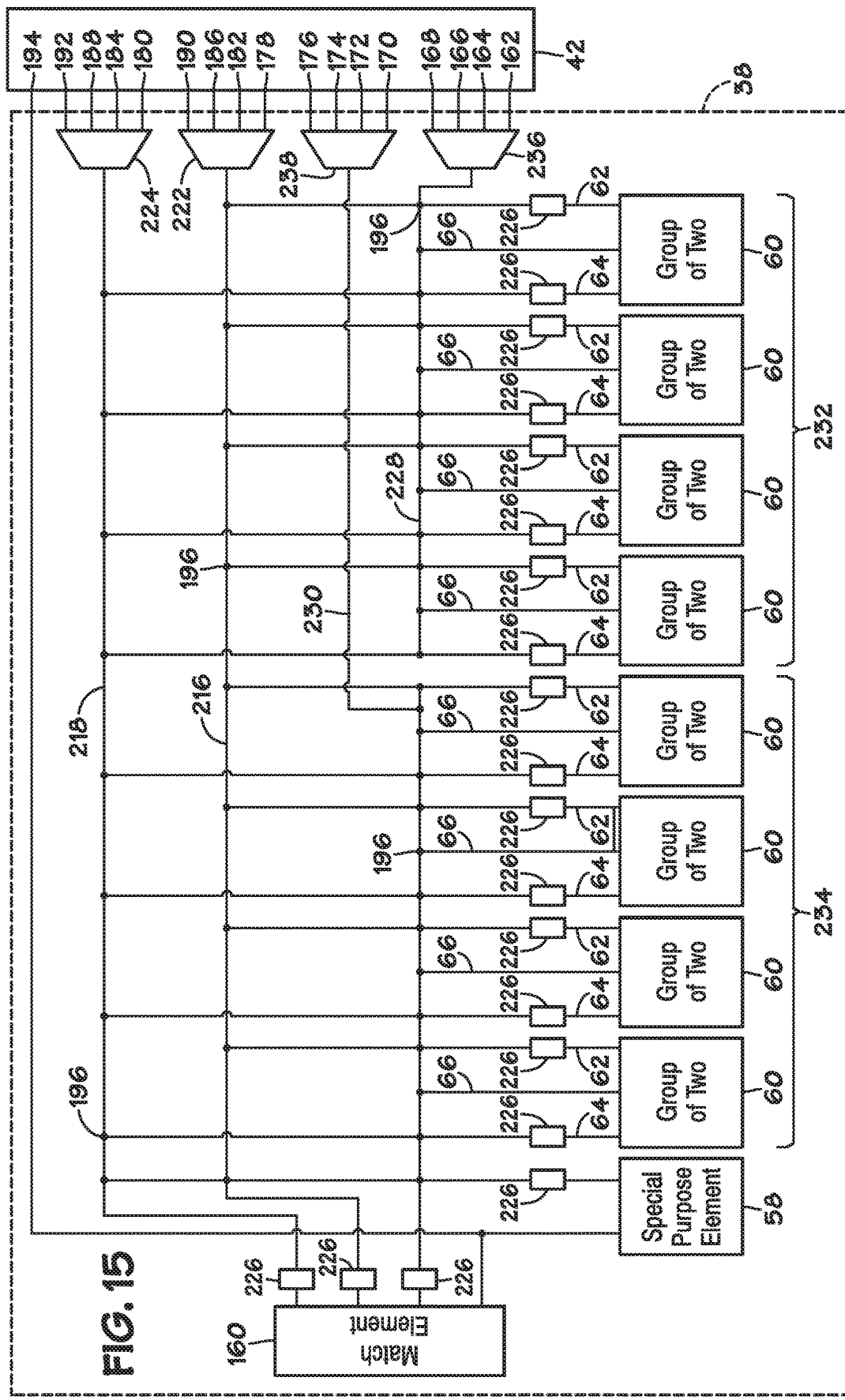
FIG. 15 illustrates a fourth example of a row of the block of FIG. 3, according to various embodiments of the invention.
Figure 16:
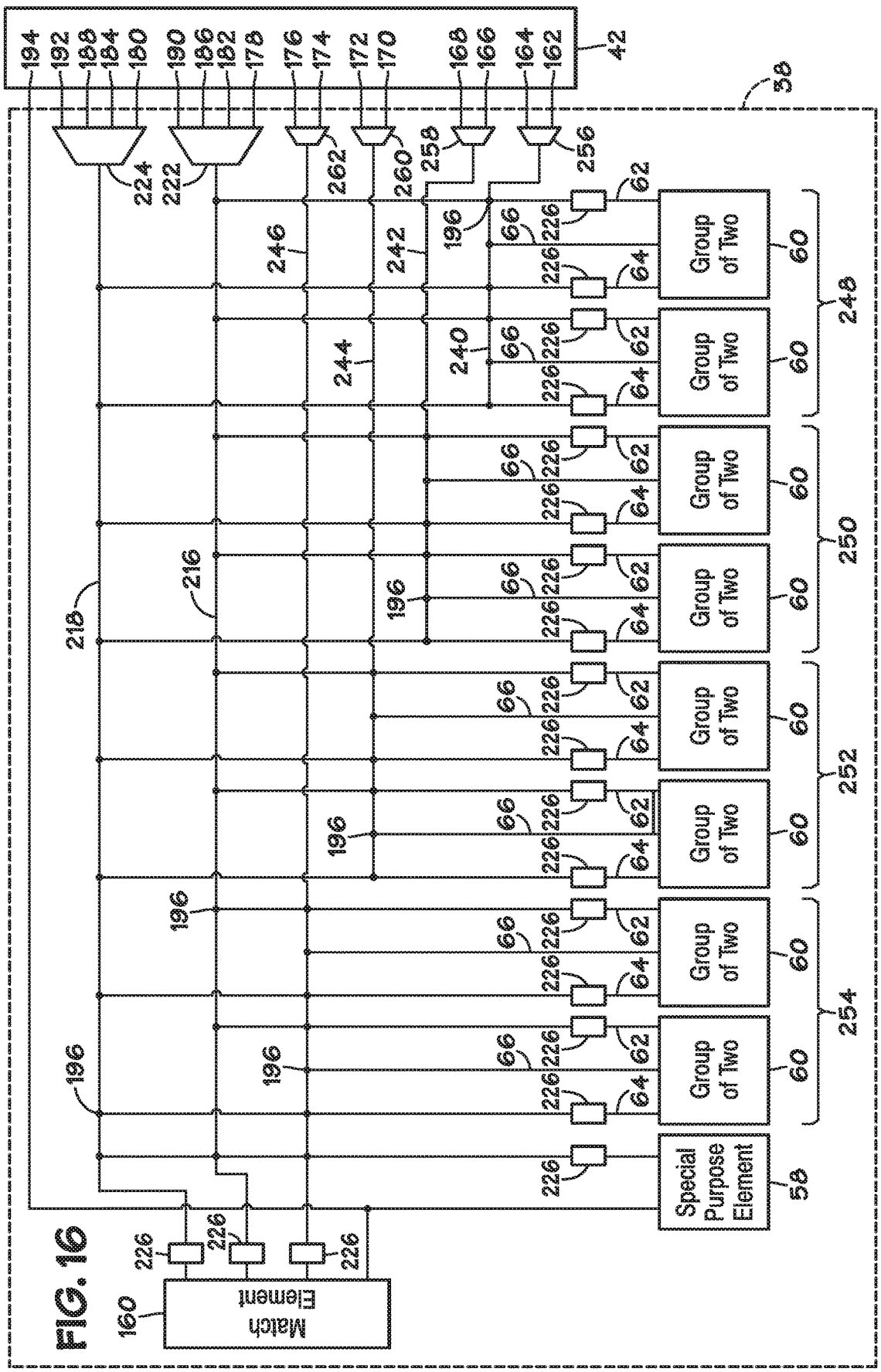
FIG. 16 illustrates a fifth example of a row of the block of FIG. 3, according to various embodiments of the invention.

Through use of a common row routing line for the outputs 66 of the GOTs 60 of a row 38, as discussed above, the number of row routing lines coupled to outputs 66 of the GOTs 60 is reduced from eight row routing lines (e.g., row routing lines 162-176), as illustrated in FIG. 10, to one row routing line (e.g., row routing line 162), as illustrated in FIG. 14, with a corresponding reduction in an amount of space (e.g. footprint) utilized by the reduced number of row routing lines. In this manner, more than one GOT 60 is directly coupled to a row routing line (e.g., row routing line 162). In other embodiments, two subgroups each including four GOTs 60 may each share a respective common row routing line (e.g., one of row routing line 162, 164) such that the number of row routing lines coupled to outputs 66 of the GOTs 60 is reduced from eight row routing lines (e.g., row routing lines 162-176), as illustrated in FIG. 10, to two row routing lines (e.g., row routing lines 162, 164), as illustrated in FIG. 15. Likewise, in some embodiments, four subgroups each including two GOTs 60 may each share a respective common row routing line (e.g., one of row routing line 162, 164, 166, and 168) such that the number of row routing lines coupled to outputs 66 of the GOTs 60 is reduced from eight row routing lines (e.g., row routing lines 162-176), as illustrated in FIG. 10, to four row routing lines (e.g., row routing lines 162, 164, 166, and 168)), as illustrated in FIG. 16. Moreover, it is appreciated that the GOTs may be divided into different numbers of subgroups than those discussed above as well, with accompanying savings in routing layout space being saved. In some embodiments, operational speeds and/or chip density of the FSM lattice 30 may be higher when more subgroups are utilized and the overall footprint of routing lines is reduced.

It may be appreciated that the individual GOTs 60 in the subgroups discussed above may each utilize a respective routing line for a respective time period. For example, each of the GOTs 60 of a subgroup may utilize the routing line coupled thereto for a respective time period. In this manner, time division multiplexing of the routing lines coupled to the GOTs 60 may be implemented. In some embodiments, the respective time periods may be equal for each GOT 60 of the subgroup or the respective time periods may different for each GOT 60 of the subgroup and may be based, for example, on the size and/or determined importance of a result being transmitted from output 66. The control of the outputs 66 of the GOTs 60 of the subgroups may be controlled in a manner similar to that described above. For example, the programming of the respective 3-to-1 multiplexers 78 of each of the GOTs 60 of a subgroup may be accomplished, for example, based on a loaded image performed during an initial programming stage of the FSM lattice 30. In other embodiment, the programming of the output select inputs 208, 210 of the respective 3-to-1 multiplexers 78 of each of the GOTs 60 of a subgroup may be accomplished, for example, based on dynamic programming instructions received during operation of the state machine engine 14 from the programming and instruction control system 159.

FIG. 14 illustrates the use of a common row routing line 214 for the outputs 66 of the GOTs 60 of a row 38. More specifically, a single row routing line 214 is coupled to outputs 66 of the GOTs 60, with a corresponding reduction in an amount of space (e.g. footprint) for routing lines. Additionally, row 38 may include row routing lines 216, 218 that may be coupled to inputs 62, 64, respectively, of the GOTs 60. Additionally, as illustrated in FIG. 14, each of the row routing lines 214, 216, and 218 includes a plurality of junction points 196, which may include all routing line crossings illustrated with a solid circle. As previously noted with respect to FIG. 10, junction points 196 may, for example, include the intra-row switching elements 44 of FIG. 3, since the junction points 196 may be utilized to selectively couple a GOT 60 to another GOT 60, or a GOT 60 to an additional element (e.g., a special purpose element 58) within the row 38 (or within another row and/or another block).

As illustrated, row routing line 214 may be coupled to a switching element 220. In one embodiment, the switching element 220 may be a demultiplexer, for example, a 1 to 8 demultiplexer. The switching element 220 may be coupled to row lines 162-176. In some embodiments, the switching element 220 may operate to transmit individual signals received from row routing line 214 to intra-block switch 42 via one of the selected row lines 162-176. The signals received from row routing line 214 may include, for example, time division multiplexed signals from the GOTs 60 so that each of the GOTs 60 of row 38 may share row routing line 214. For example, each of the individual GOTs 60 may utilize row routing line 214 for a respective portion of a time period to transmit their outputs 66. The control of the outputs 66 of the GOTs 60 may be controlled via programming of the respective 3-to-1 multiplexers 78 of each of the GOTs 60. In some embodiments, this programming may be based on a loaded image performed during an initial programming stage of the FSM lattice 30 or based on dynamic programming instructions received during operation of the state machine engine 14 from the programming and instruction control system 159. In this manner, the GOTs 60 may share the row routing line 214.

Through use of the switching element 220, there may be a reduction in the routing present in the row 38, while still allowing the GOTs 60 to be coupled to individual row lines 162-176. In some embodiments, the programming for the selection of the switching element 220 may be based on a loaded image performed during an initial programming stage of the FSM lattice 30 or based on dynamic programming instructions received during operation of the state machine engine 14 from the programming and instruction control system 159. In this manner, the switching element 220 operates to route received signals, for example outputs 66 of the GOTs 60, to one or more desired block routing lines coupled to routing lines 162-176.

As previously noted, FIG. 14 also includes row routing lines 216, 218 that may be coupled to inputs 62, 64, respectively, of the GOTs 60. In some embodiments, row routing lines 216, 218 may also transmit time division multiplexed signals. For example, switching element 222 may be coupled to row routing line 216. Switching element 222 may be, for example, a multiplexer (e.g., a 4 to 1 multiplexer) and may operate to transmit signals from any one of row line 178, 182, 186, or 190 to an input 62 of one of the GOTs 60 coupled to row routing line 216 based on a time division routine in which row lines 178, 182, 186, and 190 share, over a period of time, row routing line 216. Similarly, switching element 224 may be coupled to row routing line 218. Switching element 224 may be, for example, a multiplexer (e.g., a 4 to 1 multiplexer) and may operate to transmit signals from any one of row line 180, 184, 188, or 192 to an input 64 of one of the GOTs 60 coupled to row routing line 216 based on a time division routine in which row lines 180, 184, 188, and 192 share, over a period of time, row routing line 218. In this manner, through the use of switching elements 222, 224, the overall footprint related to routing lines of the row 38 may be further reduced.

In some embodiments, one of the inputs the inputs 62, 64 of the GOTs may be coupled to a respective storage element 226. These storage elements 226 (for example, a latch, buffer, or other element for storage of information) may operate to hold and/or accumulate values for transmission to the inputs 62, 64. For example, if only portion of an input value to a GOT 60 is received in a given period of time (e.g., due to the time division multiplexing of signals along row routing lines 214, 216, and 218), that portion of the input value may be held until the remaining portions(s) of the input value has been received. This technique may also be utilized to transmit input values to the special purpose element 58, which also may be coupled to a storage element 226. Additional configurations of the routing matrix of row 38 may include, for example, removal of one or both of switching elements 222, 224 in conjunction with removal of the corresponding routing line (216, 218, as well as removal of the respective storage elements 226 coupled thereto). In this manner, only row routing line 228 may transmit time division multiplexed signals, while the remainder of the routing matrix of the row 38 operates as described in FIG. 10.

Additional configurations of the routing lines of row 38 may be implemented. For example, FIG. 15 illustrates a row 38 that includes a common row routing line 228 for the outputs 66 of four of the GOTs 60 of the row 38 and a common row routing line 230 for the outputs 66 of the other four GOTs 60 of the row 38. More specifically, two row routing lines 228, 230 are coupled to outputs 66 of two subgroups 232, 234 of the GOTs 60, with a corresponding reduction in an amount of space (e.g. footprint) for routing lines. Additionally, row 38 may include row routing lines 216, 218 that may be coupled to inputs 62, 64, respectively, of the GOTs 60 and a plurality of junction points 196, which may include all routing line crossings illustrated with a solid circle.

As illustrated, row routing line 228 may be coupled to a switching element 236. In one embodiment, the switching element 236 may be a demultiplexer, for example, a 1 to 4 demultiplexer. The switching element 236 may be coupled to row lines 162-168. In some embodiments, the switching element 236 may operate to transmit individual signals received from row routing line 228 to intra-block switch 42 via one of the selected row lines 162-168. The signals received from row routing line 228 may include, for example, time division multiplexed signals from the GOTs 60 of subgroup 232 so that each of the GOTs 60 of subgroup 232 may share row routing line 228. For example, each of the individual GOTs 60 of subgroup 232 may utilize row routing line 228 for a respective portion of a time period to transmit their outputs 66. The control of the outputs 66 of the GOTs 60 of subgroup 232 may be controlled via programming of the respective 3-to-1 multiplexers 78 of each of the GOTs 60 of subgroup 232. In some embodiments, this programming may be based on a loaded image performed during an initial programming stage of the FSM lattice 30 or based on dynamic programming instructions received during operation of the state machine engine 14 from the programming and instruction control system 159. In this manner, the GOTs 60 of subgroup 232 may share the row routing line 228.

Similarly, row routing line 230 may be coupled to a switching element 238. In one embodiment, the switching element 238 may be a demultiplexer, for example, a 1 to 4 demultiplexer. The switching element 238 may be coupled to row lines 170-176. In some embodiments, the switching element 238 may operate to transmit individual signals received from row routing line 230 to intra-block switch 42 via one of the selected row lines 170-176. The signals received from row routing line 230 may include, for example, time division multiplexed signals from the GOTs 60 of subgroup 234 so that each of the GOTs 60 of subgroup 234 may share row routing line 230. For example, each of the individual GOTs 60 of subgroup 234 may utilize row routing line 230 for a respective portion of a time period to transmit their outputs 66. The control of the outputs 66 of the GOTs 60 of subgroup 234 may be controlled via programming of the respective 3-to-1 multiplexers 78 of each of the GOTs 60 of subgroup 234. In some embodiments, this programming may be based on a loaded image performed during an initial programming stage of the FSM lattice 30 or based on dynamic programming instructions received during operation of the state machine engine 14 from the programming and instruction control system 159. In this manner, the GOTs 60 of subgroup 234 may share the row routing line 230.

Through use of the switching elements 236, 238, there may be a reduction in the routing present in the row 38, while still allowing the GOTs 60 to be coupled to individual row lines 162-176. In some embodiments, the programming for the selection of the switching elements 236, 238 may be based on a loaded image performed during an initial programming stage of the FSM lattice 30 or based on dynamic programming instructions received during operation of the state machine engine 14 from the programming and instruction control system 159. In this manner, the switching elements 236, 238 operate to route received signals, for example outputs 66 of the GOTs 60, to one or more desired block routing lines coupled to routing lines 162-176.

Additionally, special purpose element 58 is illustrated as being coupled to row routing line 230. In some embodiments, special purpose element may be coupled only to row routing line 230, only coupled to row routing line 228, or may be coupled to both row routing line 228 and row routing line 230. Furthermore, additional configurations of the routing matrix of row 38 may include, for example, removal of one or both of switching elements 222, 224 in conjunction with removal of the corresponding routing line (216, 218, as well as removal of the respective storage elements 226 coupled thereto). In this manner, only row routing lines 228, 230 may transmit time division multiplexed signals, while the remainder of the routing matrix of the row 38 operates as described in FIG. 10. Other configurations of the routing matrix of row 38 are illustrated in conjunction with FIG. 16.

FIG. 16 illustrates a row 38 that includes a common row routing line 240 for the outputs 66 of two of the GOTs 60 of the row 38, a common row routing line 242 for the outputs 66 of two additional GOTs 60 of the row 38, a common row routing line 244 for the outputs 66 of two additional GOTs 60 of the row 38, and a common row routing line 246 for the outputs 66 of the other additional GOTs 60 of the row 38. More specifically, four row routing lines 240, 242, 244, and 246 are coupled to outputs 66 of four subgroups 248, 250, 252, and 254 of the GOTs 60, with a corresponding reduction in an amount of space (e.g. footprint) for routing lines. Additionally, row 38 may include row routing lines 216, 218 that may be coupled to inputs 62, 64, respectively, of the GOTs 60 and a plurality of junction points 196, which may include all routing line crossings illustrated with a solid circle.

As illustrated, row routing line 240 may be coupled to a switching element 256. In one embodiment, the switching element 256 may be a demultiplexer, for example, a 1 to 2 demultiplexer. The switching element 256 may be coupled to row lines 162, 164. In some embodiments, the switching element 256 may operate to transmit individual signals received from row routing line 240 to intra-block switch 42 via one of the selected row lines 162 or 164. The signals received from row routing line 240 may include, for example, time division multiplexed signals from the GOTs 60 of subgroup 248 so that each of the GOTs 60 of subgroup 248 may share row routing line 240. For example, each of the individual GOTs 60 of subgroup 248 may utilize row routing line 240 for a respective portion of a time period to transmit their outputs 66. The control of the outputs 66 of the GOTs 60 of subgroup 248 may be controlled via programming of the respective 3-to-1 multiplexers 78 of each of the GOTs 60 of subgroup 248. In some embodiments, this programming may be based on a loaded image performed during an initial programming stage of the FSM lattice 30 or based on dynamic programming instructions received during operation of the state machine engine 14 from the programming and instruction control system 159. In this manner, the GOTs 60 of subgroup 248 may share the row routing line 240.

Similarly, row routing line 242 may be coupled to a switching element 258. In one embodiment, the switching element 258 may be a demultiplexer, for example, a 1 to 2 demultiplexer. The switching element 258 may be coupled to row lines 166, 168. In some embodiments, the switching element 258 may operate to transmit individual signals received from row routing line 242 to intra-block switch 42 via one of the selected row lines 166 or 168. The signals received from row routing line 242 may include, for example, time division multiplexed signals from the GOTs 60 of subgroup 250 so that each of the GOTs 60 of subgroup 250 may share row routing line 242. For example, each of the individual GOTs 60 of subgroup 250 may utilize row routing line 242 for a respective portion of a time period to transmit their outputs 66. The control of the outputs 66 of the GOTs 60 of subgroup 250 may be controlled via programming of the respective 3-to-1 multiplexers 78 of each of the GOTs 60 of subgroup 250. In some embodiments, this programming may be based on a loaded image performed during an initial programming stage of the FSM lattice 30 or based on dynamic programming instructions received during operation of the state machine engine 14 from the programming and instruction control system 159. In this manner, the GOTs 60 of subgroup 250 may share the row routing line 242.

Likewise, row routing line 244 may be coupled to a switching element 260. In one embodiment, the switching element 260 may be a demultiplexer, for example, a 1 to 2 demultiplexer. The switching element 260 may be coupled to row lines 170, 172. In some embodiments, the switching element 260 may operate to transmit individual signals received from row routing line 244 to intra-block switch 42 via one of the selected row lines 170 or 172. The signals received from row routing line 244 may include, for example, time division multiplexed signals from the GOTs 60 of subgroup 252 so that each of the GOTs 60 of subgroup 252 may share row routing line 244. For example, each of the individual GOTs 60 of subgroup 252 may utilize row routing line 244 for a respective portion of a time period to transmit their outputs 66. The control of the outputs 66 of the GOTs 60 of subgroup 252 may be controlled via programming of the respective 3-to-1 multiplexers 78 of each of the GOTs 60 of subgroup 252. In some embodiments, this programming may be based on a loaded image performed during an initial programming stage of the FSM lattice 30 or based on dynamic programming instructions received during operation of the state machine engine 14 from the programming and instruction control system 159. In this manner, the GOTs 60 of subgroup 252 may share the row routing line 244.

Furthermore, row routing line 246 may be coupled to a switching element 262. In one embodiment, the switching element 262 may be a demultiplexer, for example, a 1 to 2 demultiplexer. The switching element 262 may be coupled to row lines 174, 176. In some embodiments, the switching element 262 may operate to transmit individual signals received from row routing line 246 to intra-block switch 42 via one of the selected row lines 174 or 176. The signals received from row routing line 246 may include, for example, time division multiplexed signals from the GOTs 60 of subgroup 254 so that each of the GOTs 60 of subgroup 254 may share row routing line 246. For example, each of the individual GOTs 60 of subgroup 254 may utilize row routing line 246 for a respective portion of a time period to transmit their outputs 66. The control of the outputs 66 of the GOTs 60 of subgroup 254 may be controlled via programming of the respective 3-to-1 multiplexers 78 of each of the GOTs 60 of subgroup 254. In some embodiments, this programming may be based on a loaded image performed during an initial programming stage of the FSM lattice 30 or based on dynamic programming instructions received during operation of the state machine engine 14 from the programming and instruction control system 159. In this manner, the GOTs 60 of subgroup 254 may share the row routing line 246.

Through use of the switching elements 256-262, there may be a reduction in the routing present in the row 38, while still allowing the GOTs 60 to be coupled to individual row lines 162-176. In some embodiments, the programming for the selection of the switching elements 256-262 may be based on a loaded image performed during an initial programming stage of the FSM lattice 30 or based on dynamic programming instructions received during operation of the state machine engine 14 from the programming and instruction control system 159. In this manner, the switching elements 256-262 operate to route received signals, for example outputs 66 of the GOTs 60, to one or more desired block routing lines coupled to routing lines 162-176.

Additionally, special purpose element 58 is illustrated as being coupled to row routing line 246. In some embodiments, special purpose element may be coupled only to row routing line 240 or 242 or 244 or 246 and/or any combination thereof. Furthermore, additional configurations of the routing matrix of row 38 may include, for example, removal of one or more of switching elements 222, 224 in conjunction with removal of the corresponding routing line (216, 218, as well as removal of the respective storage elements 226 coupled thereto). In this manner, only row routing lines 240-246 may transmit time division multiplexed signals, while the remainder of the routing matrix of the row 38 operates as described in FIG. 10.

Figure 17:
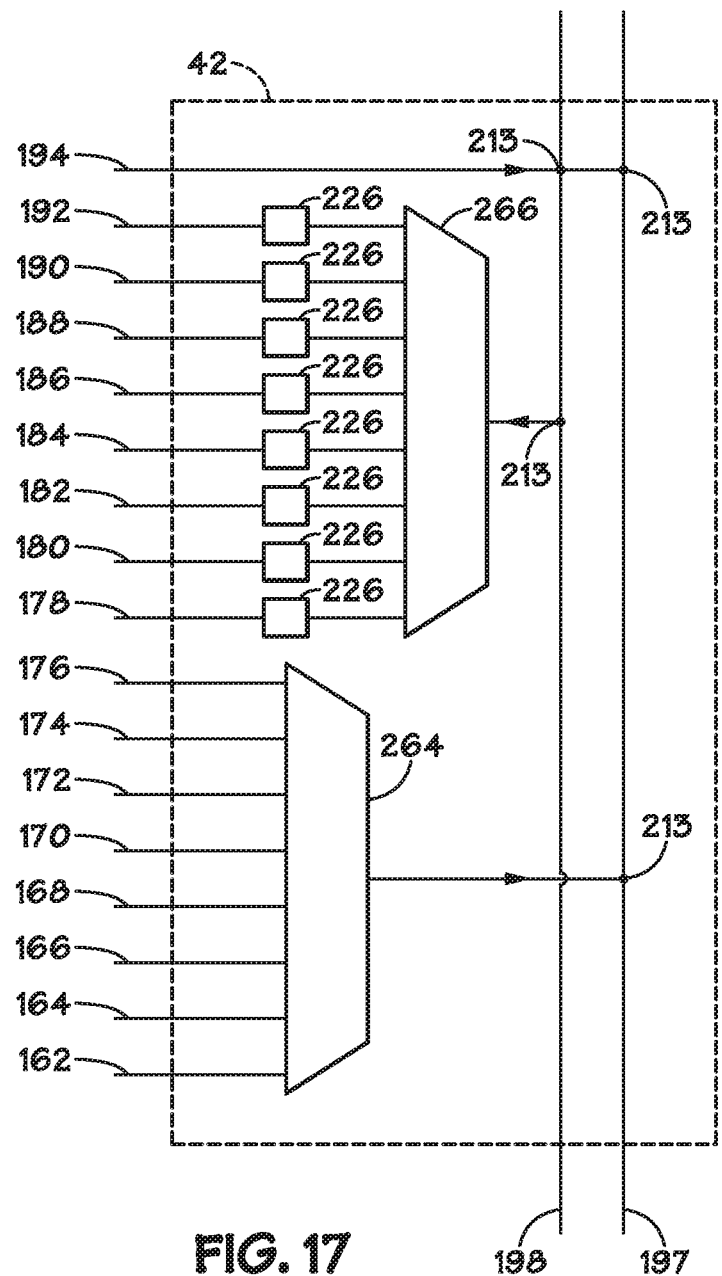
FIG. 17 illustrates a second example of the intra-block switch of FIG. 10, according to various embodiments of the invention.

Other routing areas of the FSM lattice 30 may utilize time division multiplexing to transmit signals along shared routing lines. For example, FIG. 17 shows one example of an embodiment which could reduce the block routing lines 197, 198 compared to the structure of FIG. 11, by using transferring data in time divisional manner on the block routing lines. For example, the reduced block routing lines 197, 198 may be coupled to coupled to inter-block switching elements 40 of FIG. 3, which may be coupled to the input block 52 and the output block 54 of FIG. 2. Thus, in some embodiments, corresponding demultiplexers may be provided in the output block 54 (or may be provided between the inter-block switching elements 40 and the output block 54) to allow for demultiplexing of the signals received by the output block 54 from the inter-block switching elements 40 prior to their transfer to, for example, processor 12. Similarly, in some embodiments, corresponding multiplexers may be provided in the input block 52 (or may be provided between the inter-block switching elements 40 and the input block 52) to allow for multiplexing of the signals transmitted to the inter-block switching elements 40 from the input block 52 subsequent to their transfer from, for example, processor 12. Alternatively, in some embodiments, the processor 12 may be configured to allow for multiplexed signals to be transmitted to the input block 52 and received from the output block 54 such that processor 12 can perform a transfer with the state machine engine 14 in a time divisional fashion.

Returning to FIG. 17, the intra-block switch 42 may be coupled to row routing lines 162-192 as well as the special purpose element routing line 194. In one embodiment, each of row routing lines 162, 164, 166, 168, 170, 172, 174, and 176 may provide (e.g., drive-out, send, transmit, transfer, pass, etc.) signals to the intra-block switch 42, while row routing lines 178, 180, 182, 184, 186, 188, 190, and 192 may receive (e.g., drive-in) signals from the intra-block switch 42. Accordingly, row routing lines 162, 164, 166, 168, 170, 172, 174, and 176 may be utilized to provide signals from the row 38 coupled to the intra-block switch 42 in FIGS. 10 and 14-16 to adjacent rows 38, such as those illustrated in FIG. 3. Additionally or alternatively, row routing lines 162, 164, 166, 168, 170, 172, 174, and 176 may be utilized to provide signals from the row 38 coupled to the intra-block switch 42 in FIGS. 10 and 14-16 to other rows 38 in the block 32 and/or to the block routing buffer 48. This may be accomplished by providing the signals generated in a given row 38 to one of the block routing lines 197 or 198, since the block routing lines 197, 198 are coupled to the various intra-block switches 42 and the block routing buffer 48 of FIG. 3. This may allow row 38 to provide any results generated therein to adjacent rows 38 or even other blocks 32.

As part of providing signals from row 38 to intra-switch block 42, row routing lines 162-176 may be coupled to a switching element 264. In one embodiment, the switching element 264 may be a multiplexer, for example, an 8 to 1 multiplexer. The switching element 264 may be coupled to row lines 162-176 and to block routing line 197 to transmit signals from the row 38 coupled to the intra-block switch 42 in FIGS. 10 and 14-16 to other rows 38 in the block 32 and/or to the block routing buffer 48. In other embodiments, the switching element 264 may be omitted and block routing line 197 may be directly coupled to, for example, row routing line 214 (e.g., also allowing for the omission of switching element 220).

Through the use of switching element 264 (or direct transmission of time multiplexed signals from, for example, row routing line 214), block routing line 197 may carry signals related to the operation of multiple GOTs 60 of row 38. The sharing of block routing line 197 may be accomplished via time division multiplexing, similar to that previously discussed, whereby multiple signals are individually transmitted during a set portion of a total time period allotted for signal transmission along block routing line 197. For example, individual GOTs 60 may have results transmitted along block routing line 197 for a respective portion of a time period. The control of the outputs 66 of the GOTs 60 are transmitted may be controlled via programming of the respective 3-to-1 multiplexers 78 of each of the GOTs 60 as well as preset and/or dynamic control of the switching element 264 (e.g., from the programming and instruction control system 159). Through the sharing of block routing line 197, the overall footprint of the routing matrix for the intra-block switch may be reduced.

Likewise, as part of providing signals from intra-switch block 42 to row 38, row routing lines 178-192 may be coupled to a switching element 266. In one embodiment, the switching element 266 may be a demultiplexer, for example, a 1 to 8 demultiplexer. The switching element 266 may be coupled to row lines 178-192 and to block routing line 198 to transmit signals from other rows 38 in the block 32 and/or to the block routing buffer 48 to the row 38 directly coupled to the intra-block switch 42 of FIG. 17. As illustrated, storage elements 226 may be present to accumulate or buffer input values for transmission to row 38 via row lines 178-192. In other embodiments, the switching element 264 and the storage elements 226 may be omitted and block routing line 198 may be directly coupled to, for example, row routing lines 216, 218 (e.g., also allowing for the omission of switching elements 222, 224).

Through the use of switching element 266 (or direct transmission of time multiplexed signals to, for example, row routing lines 216, 218), block routing line 198 may carry signals related to the operation of multiple GOTs 60 of additional rows 38. The sharing of block routing line 198 may be accomplished via time division multiplexing, similar to that previously discussed, whereby multiple signals are individually transmitted during a set portion of a total time period allotted for signal transmission along block routing line 198, such that individual results may be transmitted along block routing line 198 for a respective portion of a time period. Control of the transmission of the results along 198 as well as control of the switching element 266 may be preset and/or dynamic (e.g., from the programming and instruction control system 159). Through the sharing of block routing line 198, the overall footprint of the routing matrix for the intra-block switch 42 may be reduced.

Figure 18:
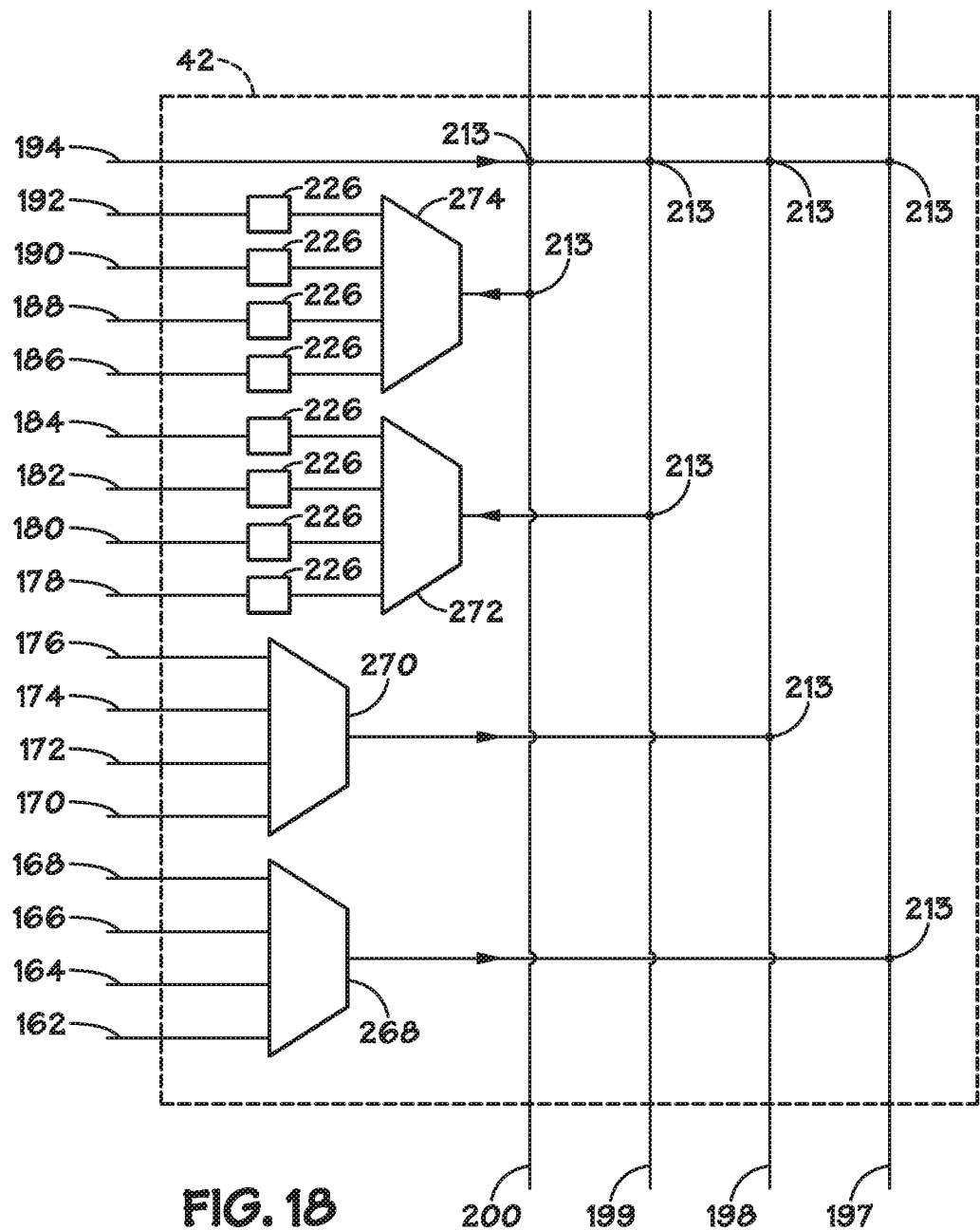
FIG. 18 illustrates a third example of the intra-block switch of FIG. 10, according to various embodiments of the invention.

Additional configurations of the block routing lines of intra-block switch 42 may be implemented. For example, FIG. 18 illustrates an intra-block switch 42 that includes switching elements 268, 270 that may be coupled to row routing lines 162-168 and 170-176, respectively, to provide (e.g., drive-out, send, transmit, transfer, pass, etc.) signals to the intra-block switch 42. Likewise, intra-block switch 42 includes switching elements 272, 274 that may be coupled to row routing lines 178-184 and 186-192, respectively, to receive (e.g., drive-in) signals to the row 38 coupled to the intra-block switch 42. This may be accomplished by providing the signals generated in a given row 38 to one of the block routing lines 197-200, since the block routing lines 197-200 are coupled to the various intra-block switches 42 and the block routing buffer 48 of FIG. 3. This may allow row 38 to provide any results generated therein to adjacent rows 38 or even other blocks 32.

In one embodiment, the switching elements 268 and 270 may be multiplexers, for example, 4 to 1 multiplexers while switching elements 272 and 274 may be demultiplexers, for example, 1 to 4 demultiplexers. The switching elements 268, 270 may transmit signals from the row 38 coupled to the intra-block switch 42 in FIGS. 10 and 14-16 to other rows 38 in the block 32 and/or to the block routing buffer 48. In other embodiments, the switching elements 268, 270 may be omitted and block routing lines 197, 198 may be directly coupled to, for example, row routing lines 228, 230 (e.g., also allowing for the omission of switching elements 236, 238).

Through the use of switching elements 268, 270 (or direct transmission of time multiplexed signals from, for example, row routing lines 228, 230), block routing lines 197, 198 may carry signals related to the operation of multiple GOTs 60 of row 38. The sharing of block routing lines 197, 198 may be accomplished via time division multiplexing, similar to that previously discussed, whereby multiple signals are individually transmitted during a set portion of a total time period allotted for signal transmission along block routing lines 197, 198. For example, individual GOTs 60 may have results transmitted along block routing lines 197, 198 for a respective portion of a time period. The control of the outputs 66 of the GOTs 60 are transmitted may be controlled via programming of the respective 3-to-1 multiplexers 78 of each of the GOTs 60 as well as preset and/or dynamic control of the switching elements 268, 270 (e.g., from the programming and instruction control system 159). Through the sharing of block routing lines 197, 198 the overall footprint of the routing matrix for the intra-block switch 42 may be reduced.

Likewise, as part of providing signals from intra-switch block 42 to row 38, row routing lines 178-192 may be coupled to switching elements 272, 274. In one embodiment, the switching element 272 may be coupled to row lines 178-184 and to block routing line 199 to transmit signals from other rows 38 in the block 32 and/or to the block routing buffer 48 to the row 38 directly coupled to the intra-block switch 42 of FIG. 18. Similarly, switching element 274 may be coupled to row lines 186-192 and to block routing line 200 to transmit signals from other rows 38 in the block 32 and/or to the block routing buffer 48 to the row 38 directly coupled to the intra-block switch 42 of FIG. 18. As illustrated, storage elements 226 may be present to accumulate or buffer input values for transmission to row 38 via row lines 178-192. In other embodiments, the switching elements 272, 274 and the storage elements 226 may be omitted and block routing lines 199, 200 may be directly coupled to, for example, row routing lines 216, 218 (e.g., also allowing for the omission of switching elements 222, 224).

Through the use of switching elements 272, 274 (or direct transmission of time multiplexed signals to, for example, row routing lines 216, 218), block routing lines 199, 200 may carry signals related to the operation of multiple GOTs 60 of additional rows 38. The sharing of block routing lines 199, 200 may be accomplished via time division multiplexing, similar to that previously discussed, whereby multiple signals are individually transmitted during a set portion of a total time period allotted for signal transmission along block routing line 199, 200, such that individual results may be transmitted along block routing lines 199, 200 for a respective portion of a time period. Control of the transmission of the results along lines 199, 200 as well as control of the switching elements 272, 274 may be preset and/or dynamic (e.g., from the programming and instruction control system 159). Through the sharing of block routing lines 199, 200, the overall footprint of the routing matrix for the intra-block switch may be reduced.

Figure 19:
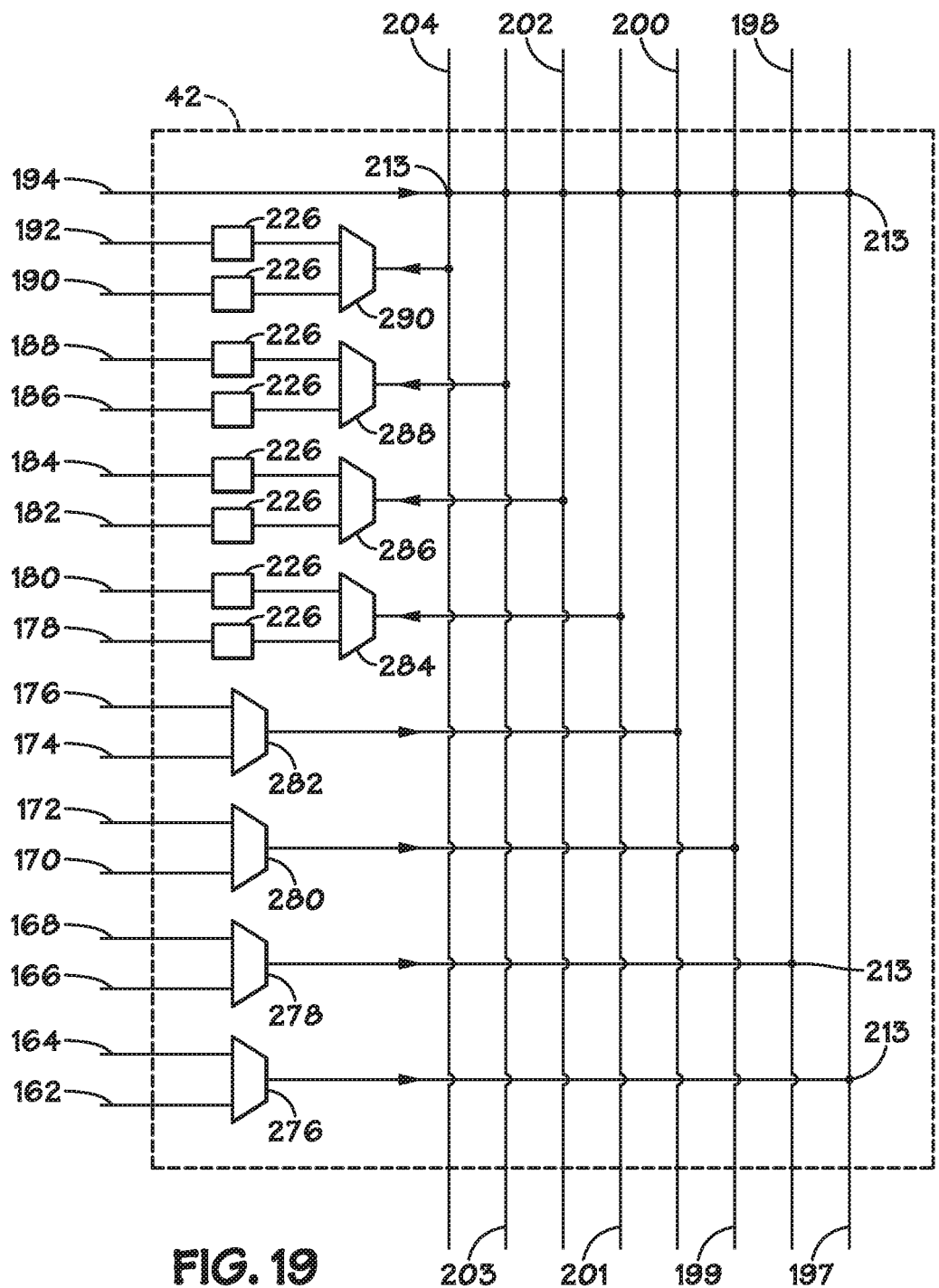
FIG. 19 illustrates a third example of the intra-block switch of FIG. 10, according to various embodiments of the invention.

Other configurations of the block routing lines of intra-block switch 42 may be implemented. For example, FIG. 19 illustrates an intra-block switch 42 that includes switching elements 276-282 that may be coupled to sets of two row routing lines 162-176, respectively, to provide (e.g., drive-out, send, transmit, transfer, pass, etc.) signals to the intra-block switch 42. Likewise, intra-block switch 42 includes switching elements 284-290 that may be coupled to sets of row routing lines 178-192, respectively, to receive (e.g., drive-in) signals to the row 38 coupled to the intra-block switch 42. This may be accomplished by providing the signals generated in a given row 38 to one of the block routing lines 197-200, since the block routing lines 197-204 are coupled to the various intra-block switches 42 and the block routing buffer 48 of FIG. 3. This may allow row 38 to provide any results generated therein to adjacent rows 38 or even other blocks 32.

In one embodiment, the switching elements 276-282 may be multiplexers, for example, 2 to 1 multiplexers, while switching elements 284-290 may be demultiplexers, for example, 1 to 2 demultiplexers. The switching elements 276-282 may transmit signals from the row 38 coupled to the intra-block switch 42 in FIGS. 10 and 14-16 to other rows 38 in the block 32 and/or to the block routing buffer 48. In other embodiments, the switching elements 276-282 may be omitted and block routing lines 197-200 may be directly coupled to, for example, row routing lines 240-246 (e.g., also allowing for the omission of switching elements 256-262).

Through the use of switching elements 276-282 (or direct transmission of time multiplexed signals from, for example, row routing lines 240-246), block routing lines 197-200 may carry signals related to the operation of multiple GOTs 60 of row 38. The sharing of block routing lines 197-200 may be accomplished via time division multiplexing, similar to that previously discussed, whereby multiple signals are individually transmitted during a set portion of a total time period allotted for signal transmission along block routing lines 197-200. For example, individual GOTs 60 may have results transmitted along block routing lines 197-200 for a respective portion of a time period. The control of the outputs 66 of the GOTs 60 are transmitted may be controlled via programming of the respective 3-to-1 multiplexers 78 of each of the GOTs 60 as well as preset and/or dynamic control of the switching elements 276-282 (e.g., from the programming and instruction control system 159). Through the sharing of block routing lines 197-201 the overall footprint of the routing matrix for the intra-block switch 42 may be reduced.

Likewise, as part of providing signals from intra-switch block 42 to row 38, row routing lines 178-192 may be coupled to switching elements 284-290, respectively, in groups of two. As illustrated, storage elements 226 may be present to accumulate or buffer input values for transmission to row 38 via row lines 178-192. In other embodiments, the switching elements 284-290 and the storage elements 226 may be omitted and block routing lines 201-204 may be directly coupled to, for example, row routing lines 216, 218 (e.g., also allowing for the omission of switching elements 222, 224).

Through the use of switching elements 284-290 (or direct transmission of time multiplexed signals to, for example, row routing lines 216, 218), block routing lines 201-204 may carry signals related to the operation of multiple GOTs 60 of additional rows 38. The sharing of block routing lines 201-204 may be accomplished via time division multiplexing, similar to that previously discussed, whereby multiple signals are individually transmitted during a set portion of a total time period allotted for signal transmission along block routing lines 201-204, such that individual results may be transmitted along block routing lines 201-204 for a respective portion of a time period. Control of the transmission of the results along lines 201-204, as well as control of the switching elements 284-290 may be preset and/or dynamic (e.g., from the programming and instruction control system 159). Through the sharing of block routing lines 201-204, the overall footprint of the routing matrix for the intra-block switch may be reduced.

It should also be noted that the techniques for reducing the size of the routing matrices of rows 38 and intra-block switches 42 may also be applied to other areas of the FSM lattice 30. For example, inter-block routing matrices may utilize the time division multiplexing techniques laid out with respect to FIGS. 14-19 to reduce inter-block routing lines of the FSM lattice 30. Similarly, any other routing areas of the FSM lattice 30 may have the time division multiplexing techniques discussed above applied to a particular portion of the FSM lattice 30 to, for example, allow for increased chip density of the state machine engine 14.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method, comprising:
   analyzing a portion of a data stream via a first automaton comprising a first plurality of memory cells of a first group of two sets of memory cells and a second plurality of memory cells of the first group of two sets of memory cells to generate a first result;

analyzing the portion of the data stream via a second automaton comprising a third plurality of memory cells of a second group of two sets of memory cells and a fourth plurality of memory cells of the second group of two sets of memory cells to generate a second result;

outputting the first result to a routing line coupled to the first automaton during a first portion of a data cycle; and outputting the second result to the routing line coupled to the second automaton during a second portion of the data cycle.

2. The method of claim 1, comprising analyzing the portion of the data stream via a third automaton comprising a fifth plurality of memory cells of a third group of two sets of memory cells and a sixth plurality of memory cells of the third group of two sets of memory cells to generate a third result.

3. The method of claim 2, comprising outputting the third result to the routing line coupled to the third automaton during a third portion of the data cycle.

4. The method of claim 2, comprising:
receiving the first result, the second result, and the third result at a demultiplexer; and
selectively transmitting the first result, the second result, and the third result to an intra-block switch via row lines selected by the demultiplexer.

5. The method of claim 2, comprising outputting the third result to a second routing line coupled to the third automaton during the first portion of the data cycle.

6. The method of claim 5, comprising:
analyzing the portion of the data stream via a fourth automaton comprising a seventh plurality of memory cells of a fourth group of two sets of memory cells and an eighth plurality of memory cells of the fourth group of two sets of memory cells to generate a fourth result; and
outputting the fourth result to the second routing line coupled to the fourth automaton during the second portion of the data cycle.

7. The method of claim 6, comprising:
receiving the first result and the second result at a first demultiplexer; and
receiving the third result and the fourth result at a second demultiplexer.

8. The method of claim 7, comprising:
selectively transmitting the first result and the second result to an intra-block switch via first row lines selected by the first demultiplexer; and selectively transmitting the third result and the fourth result to the intra-block switch via second row lines selected by the second demultiplexer.

9. A method, comprising:
receiving a first control signal at a first selection circuit of a first automaton comprising a first plurality of memory cells configured to analyze at least a portion of a data stream and generate a first result;

outputting the first result to a routing line coupled to the first automaton during a first portion of a data cycle based on the first control signal;

receiving a second control signal at a second selection circuit of a second automaton comprising a second plurality of memory cells configured to analyze at least a portion of the data stream and generate a second result; and outputting the second result to the routing line coupled to the second automaton during a second portion of the data cycle based on the second control signal.

10. The method of claim 9, comprising receiving the first control signal and the second control signal as part of initial configuration instructions received prior to generation of at least one of the first result and the second result.

11. The method of claim 9, comprising receiving the first control signal and the second control signal as part of dynamic programming instructions received during generation of at least one of the first result and the second result.

12. The method of claim 9, comprising receiving a third control signal at a third selection circuit of a third automaton comprising a third plurality of memory cells configured to analyze at least a portion of the data stream and generate a third result.

13. The method of claim 12, comprising outputting the third result to the routing line coupled to the third automaton during a third portion of the data cycle based on the third control signal.

14. The method of claim 12, comprising outputting the third result to a second routing line coupled to the third automaton during the first portion of the data cycle based on the third control signal.

15. The method of claim 12, comprising outputting the third result to a second routing line coupled to the third automaton during a third portion of the data cycle based on the third control signal.

16. The method of claim 9, wherein the at least a portion of the data stream analyzed by the first automaton and the at least a portion of the data stream analyzed by the second automaton comprise different portions of the data stream.

* * * * *